United States Patent [19]

Hisano

[11] Patent Number: 5,530,838
[45] Date of Patent: Jun. 25, 1996

[54] METHOD AND APPARATUS FOR CONTROLLING ACCESS TO MEMORY WHICH IS COMMON TO PLURAL, PRIORITY-ORDERED CENTRAL PROCESSING UNITS AND WHICH IS INDIRECTLY ACCESSIBLE VIA A TRANSFER CONTROL UNIT

[75] Inventor: Kyosuke Hisano, Atsugi, Japan

[73] Assignee: Ricoh Company, Ltd., Tokyo, Japan

[21] Appl. No.: 257,830

[22] Filed: Jun. 9, 1994

[30] Foreign Application Priority Data

Jun. 10, 1993 [JP] Japan .................................... 5-138038
Nov. 30, 1993 [JP] Japan .................................... 5-299237
Mar. 31, 1994 [JP] Japan .................................... 6-062302

[51] Int. Cl.$^6$ .................................................. G06F 13/00
[52] U.S. Cl. .................. 395/478; 395/200.08; 395/287;
  364/934.46; 364/937.01; 364/964.27; 364/DIG. 2
[58] Field of Search .................................... 395/860, 841,
  395/485, 474, 457, 308, 293, 291, 290,
  287, 478, 200.08; 340/825.5; 364/131–134

[56] References Cited

U.S. PATENT DOCUMENTS

| | | | |
|---|---|---|---|
| 4,257,095 | 3/1981 | Nadir | 395/325 |
| 4,395,753 | 7/1983 | Comfort et al. | 395/325 |
| 4,633,392 | 12/1986 | Vincent et al. | 395/325 |
| 4,837,682 | 6/1989 | Culler | 395/325 |
| 4,924,380 | 5/1990 | McKinney et al. | 395/325 |

FOREIGN PATENT DOCUMENTS 3-52052  6/1991  Japan .

*Primary Examiner*—Alyssa H. Bowler
*Assistant Examiner*—Alpesh M. Shah
*Attorney, Agent, or Firm*—Lowe, Price, LeBlanc & Becker

[57] ABSTRACT

There is provided a common-memory controlling apparatus which controls data transfer between a common-memory and a plurality of central processing units. A separating buffer separates a CPU bus connected to each of the central processing units from a common-memory bus connected to the common-memory. A request signal generating circuit generates a request signal for accessing to the common-memory when each of the central processing units requires accesses to the common-memory. An arbitration circuit arbitrates the request signals supplied by the central processing units so that a request signal corresponding to one of the central processing units is selected. The central processing unit having the highest priority level is served. A control signal generating unit generates control signals used for controlling a bus connection corresponding to the selected central processing unit so that the CPU bus connected to the selected central processing unit is connected to the common-memory.

14 Claims, 18 Drawing Sheets

CPU(1) MEMORY SPACE

CPU(2) MEMORY SPACE

FIG. 10
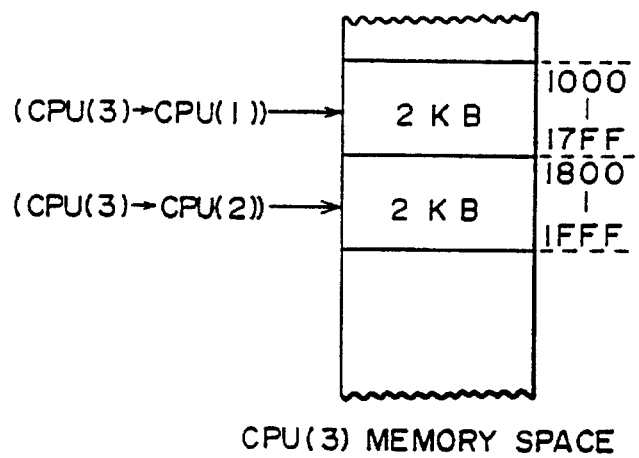
CPU(3) MEMORY SPACE
FIG. 11
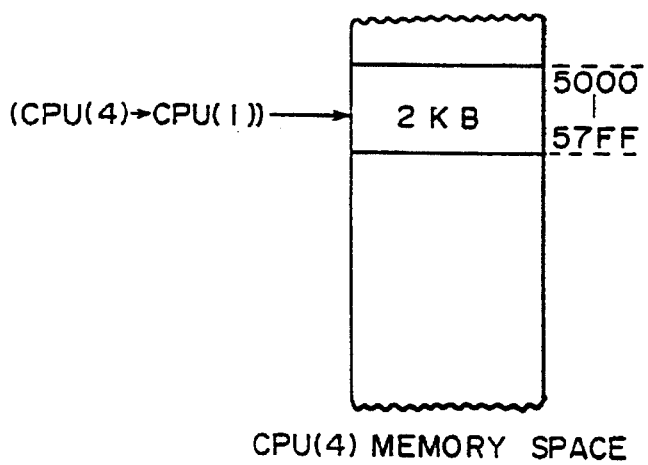
CPU(4) MEMORY SPACE
FIG. 12
| INPUT ADDRESS | | OUTPUT ADDRESS | | | | | | | |
|---|---|---|---|---|---|---|---|---|---|
| | | AO12 | AO11 | AO12 | AO11 | AO12 | AO11 | AO12 | AO11 |
| AI12 | AI11 | 0 | 0 | 0 | 1 | 1 | 0 | 1 | 1 |
| 0 | 0 | 0 | 0 | 0 | 0 | 1 | 0 | 1 | 1 |
| 0 | 1 | 1 | 1 | 0 | 0 | 0 | 1 | 1 | 0 |
| 1 | 0 | 1 | 0 | 1 | 1 | 0 | 0 | 0 | 1 |
| 1 | 0 | 0 | 1 | 1 | 0 | 1 | 1 | 0 | 0 |

FIG. 13A

| REGISTER FILE (1) | | REGISTER FILE (2) | | REGISTER FILE (3) | | REGISTER FILE (4) | |
|---|---|---|---|---|---|---|---|
| AD12 | AD11 | AD12 | AD11 | AD12 | AD11 | AD12 | AD11 |
| 0 | 0 | X | X | X | X | X | X |

FIG. 13B

| REGISTER FILE (5) | | REGISTER FILE (6) | | REGISTER FILE (7) | | REGISTER FILE (8) | |
|---|---|---|---|---|---|---|---|
| AD12 | AD11 | AD12 | AD11 | AD12 | AD11 | AD12 | AD11 |
| 0 | 0 | X | X | X | X | X | X |

FIG. 13C

| REGISTER FILE (9) | | REGISTER FILE (10) | | REGISTER FILE (11) | | REGISTER FILE (12) | |
|---|---|---|---|---|---|---|---|
| AD12 | AD11 | AD12 | AD11 | AD12 | AD11 | AD12 | AD11 |
| 0 | 0 | 1 | 0 | 1 | 1 | 0 | 0 |

FIG. 13D

| REGISTER FILE (13) | | REGISTER FILE (14) | | REGISTER FILE (15) | | REGISTER FILE (16) | |
|---|---|---|---|---|---|---|---|
| AD12 | AD11 | AD12 | AD11 | AD12 | AD11 | AD12 | AD11 |
| X | X | 0 | 0 | 0 | 0 | X | X |

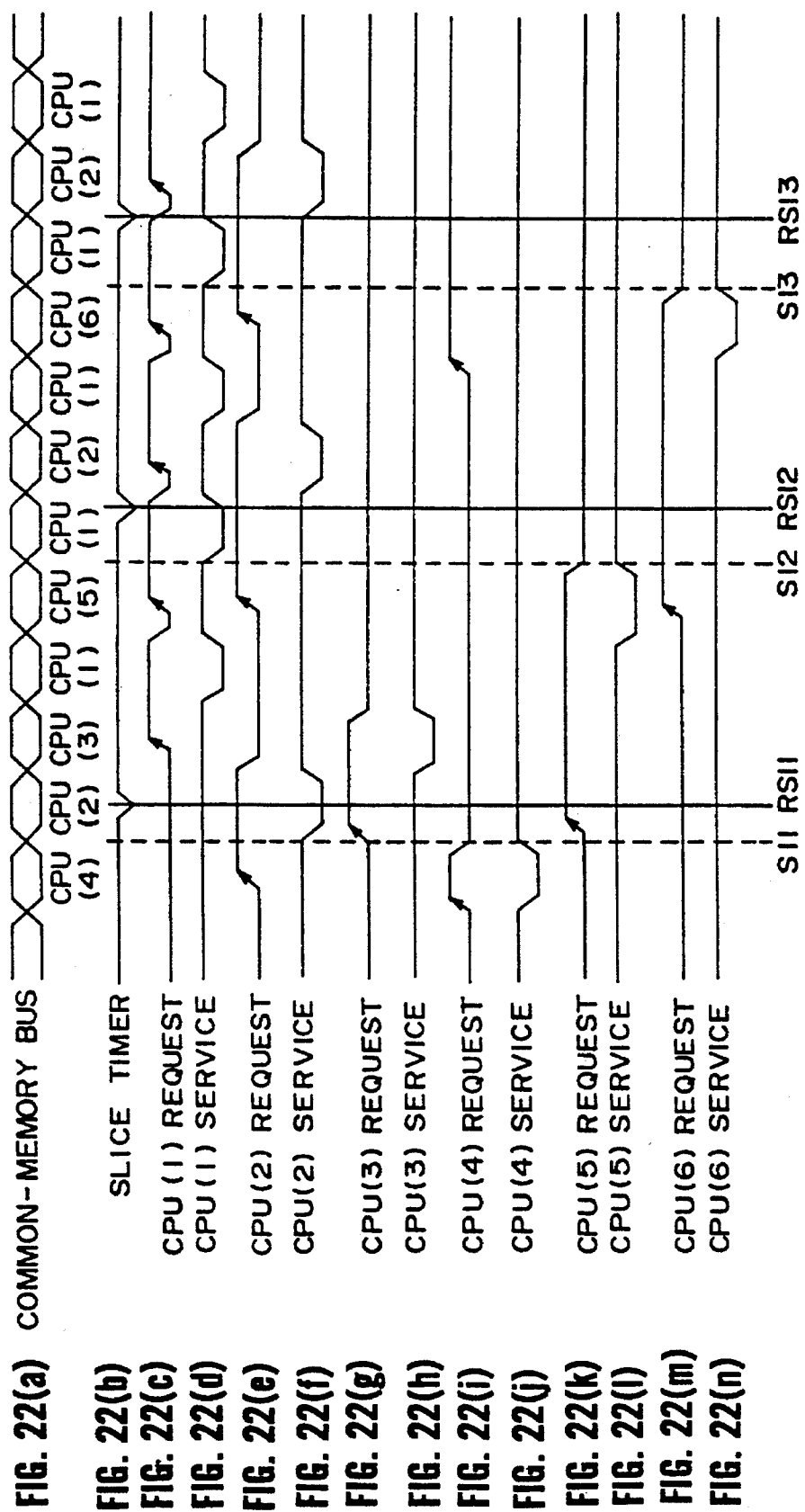

5,530,838

METHOD AND APPARATUS FOR CONTROLLING ACCESS TO MEMORY WHICH IS COMMON TO PLURAL, PRIORITY-ORDERED CENTRAL PROCESSING UNITS AND WHICH IS INDIRECTLY ACCESSIBLE VIA A TRANSFER CONTROL UNIT

BACKGROUND OF THE INVENTION

The present invention generally relates to a common-memory controlling method and apparatus, and more particularly to a common-memory controlling method and apparatus in which a plurality of central processing units are connected to a common-memory, waiting time being reduced when the common-memory is simultaneously accessed by the plurality of central processing units.

A common-memory controlling apparatus is disclosed in Japanese Laid-Open Patent Application No. 3-2052. In this common-memory controlling apparatus, each of central processing units (CPUs) connected to a common-memory is provided with an arbitration code setting circuit, an arbitration code cyclic circuit and a bus arbitration circuit which are interconnected through a bus. A priority level of each of the CPUs is cycled by altering an arbitration code for each arbitration cycle. Accordingly, equal opportunity of a priority for using the bus can be provided to each of the CPUs.

However, since a plurality of CPUs are connected to the common-memory through the bus, there is a problem in that if a CPU having a long access time is connected, a waiting time for other CPUs is increased.

SUMMARY OF THE PRESENT INVENTION

It is a general object of the present invention to provide an improved and useful common-memory controlling method and apparatus in which the above-mentioned problem can be eliminated.

A more specific object of the present invention is to provide a common-memory controlling method and apparatus in which an indirect access to a common-memory can be performed using a data transfer controlling unit.

Another object of the present invention is to provide a common-memory controlling method and apparatus in which next data can be immediately accessed by a CPU, without being delayed due to an access performed by other CPUs, by obtaining the next data in advance during the last data-read cycle performed by the particular CPU.

Another object of the present invention is to provide a common-memory controlling method and apparatus in which a memory space exclusively used by each of the CPUs can be mapped to be a consecutive space in a common-memory.

Another object of the present invention is to provide a common-memory controlling method and apparatus in which an access to a common-memory is performed at a predetermined period for a CPU having a fixed priority, while an access to a common-memory performed by a CPU having a lower priority level is performed with equal opportunity.

In order to achieve the above-mentioned objects, there is provided according to the present invention, a common-memory controlling method which controls data transfer between a common-memory and a plurality of central processing units, the common-memory controlling method comprising the steps of:

a) separating a CPU bus connected to each of the central processing units from a common-memory bus connected to the common-memory;

b) generating a request signal for accessing to the common-memory when each of the central processing units requires accesses to the common-memory;

c) arbitrating the request signals for each of the central processing units so that a request signal corresponding to one of the central processing units is selected, the one of the central processing units having a highest priority level to be served;

d) generating control signals used for controlling a bus connection corresponding to the one of the central processing units so that the CPU bus connected to the one of the central processing units is connected to the common-memory.

There is provided according to the present invention, a common-memory controlling apparatus which controls data transfer between a common-memory and a plurality of central processing units, the common-memory controlling apparatus comprising:

a separating buffer for separating a CPU bus connected to each of the central processing units from a common-memory bus connected to the common-memory;

a request signal generating circuit for generating a request signal for accessing to the common-memory when each of the central processing units requires accesses to the common-memory;

an arbitration circuit for arbitrating the request signals supplied by the central processing units so that a request signal corresponding to one of the central processing units is selected, the one of the central processing units having a highest priority level to be served;

a control signal generating unit for generating control signals used for controlling a bus connection corresponding to the one of the central processing units so that the CPU bus connected to the one of the central processing units is connected to the common-memory.

Other objects, features and advantages of the present invention will become more apparent from the following detailed description when read in conjunction with the accompanying drawings.

BRIEF DESCRIPTION OF THE DRAWINGS

FIG. 10 is an illustration of a part of a memory space of one of the CPUs shown in FIG. 1;

FIG. 11 is an illustration of a part of a memory space of one of the CPUs shown in FIG. 1;

FIG. 12 is an illustration showing an address conversion table representing a matrix of input address data and output address data;

FIGS. 13A through 13D are illustrations showing setting values of each of the register files in a case where the mapping is performed by the upper address converting circuit shown in FIG. 6;

FIGS. 22(a)–22(n) are a timing chart of an operation performed in the fifth embodiment according to the present invention.

DETAILED DESCRIPTION OF THE PREFERRED EMBODIMENTS

Figure 1:
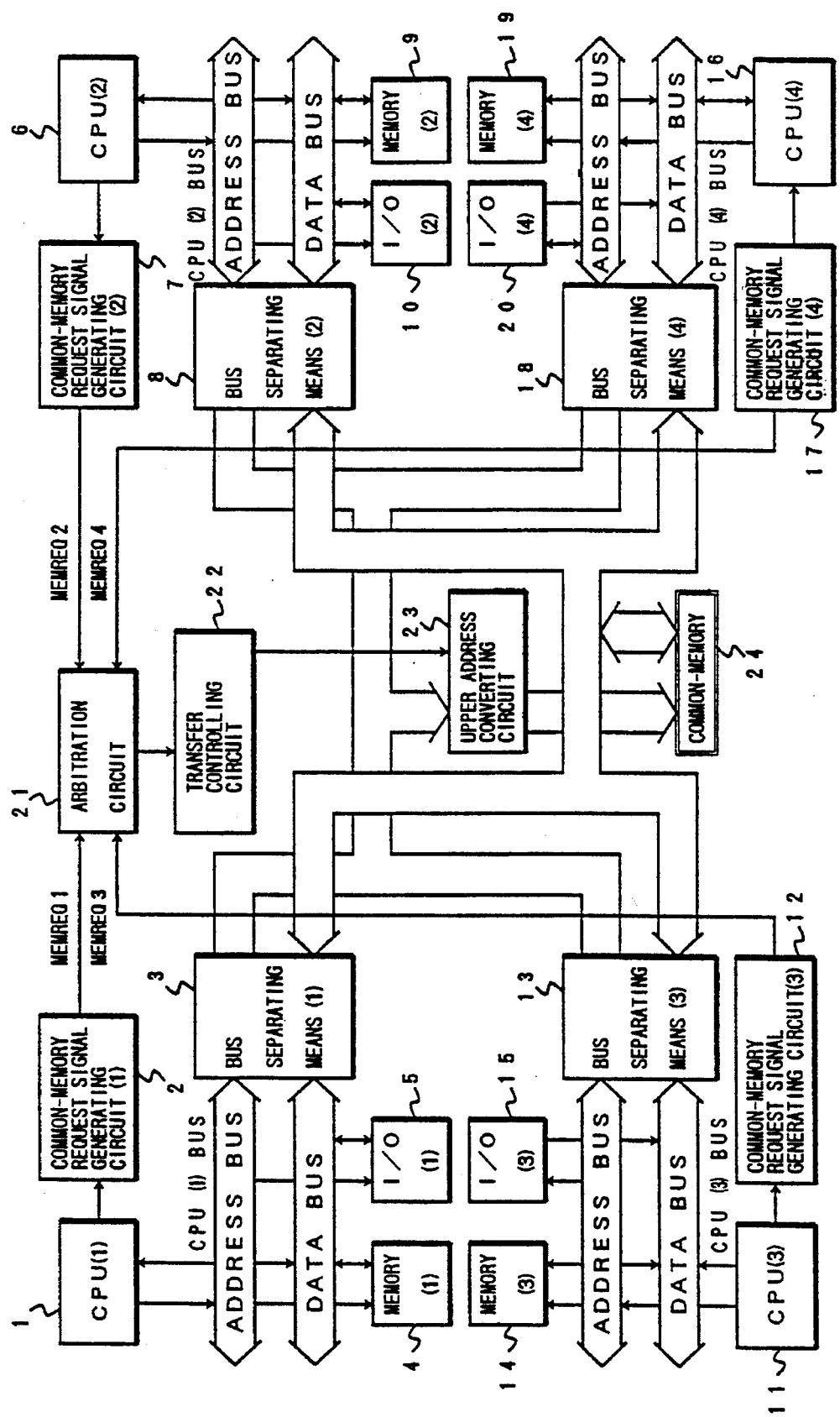
FIG. 1 is a block diagram of a first embodiment of a common-memory controlling apparatus according to the present invention.

A description will now be given, with reference to FIG. 1, of a first embodiment of a common-memory controlling apparatus according to the present invention. FIG. 1 is a block diagram of a common-memory controlling apparatus according to the present invention.

The common-memory controlling apparatus shown in FIG. 1 comprises four CPU blocks having the same structure to each other, an arbitration circuit 21, a transfer controlling unit 22, an upper address converting circuit 23 and a common-memory 24. Each of the CPU blocks, for example a first CPU block, comprises a CPU(1) 1, a common-memory request signal generating circuit 2, bus separating means 3, a memory 4 and an input/output (I/O) unit 5. The CPU(1) 1 controls a CPU(1) bus. The common-memory request signal generating circuit 2 generates a request signal MEMREQ1 to perform an access to the common-memory 24. The bus separating means 3, comprising a bus separating buffer, acts as means for separating the CPU(1) bus from a common-memory bus connected to the common-memory 24. The memory 4 and the I/O unit 5 are connected to the CPU(1) bus. The other three CPU blocks have the same structure as the first CPU device, and description thereof will be omitted.

The arbitration circuit 21 performs an arbitration on request signals supplied by the common-memory request signal generating circuits 2, 6, 12 and 17. The transfer controlling unit 22 generates a timing controlling signal so as to control a transfer timing of data, and signals transferred through the common-memory bus. The upper address converting circuit 23 changes an upper part of address data used by the common-memory 24. The common-memory 24 stores data used by each of the CPUs 1, 6, 11 and 16.

A description will now be given of a basic structure of the first embodiment.

In the present embodiment, each of the CPU buses (CPU(1) bus to CPU(4) bus) is separated from the common-memory bus by the respective bus separating means 3, 8, 13 and 18 in a state where there is no access by each of the CPUs 1, 6, 11 and 16. Requests for access to the common-memory 24 performed by the CPUs 1, 6, 11 and 16 are arbitrated by the arbitration circuit 21, and then one of the CPUs is allowed to access to the common-memory 24 so that data for the particular CPU can be read from/written into the common-memory 24.

If, for example, a request for access to the common-memory 24 arises from the CPU(1), the request signal MEMREQ1 is generated by the common-memory request signal generating circuit 2. The request signal MEMREQ1 is then sent to the arbitration circuit 21. Other request signals may be sent at the same time to the arbitration circuit 21. The arbitration circuit 21 arbitrates those request signals to select one CPU according to a priority order so that one transfer cycle is assigned to the selected CPU by the transfer controlling unit 22 using the timing control signal. For each of the CPUs other than the selected CPU, a wait signal is sent from the arbitration circuit 21. Accordingly, the CPUs used in the present system must be adapted to accept the wait signal.

Figure 2:
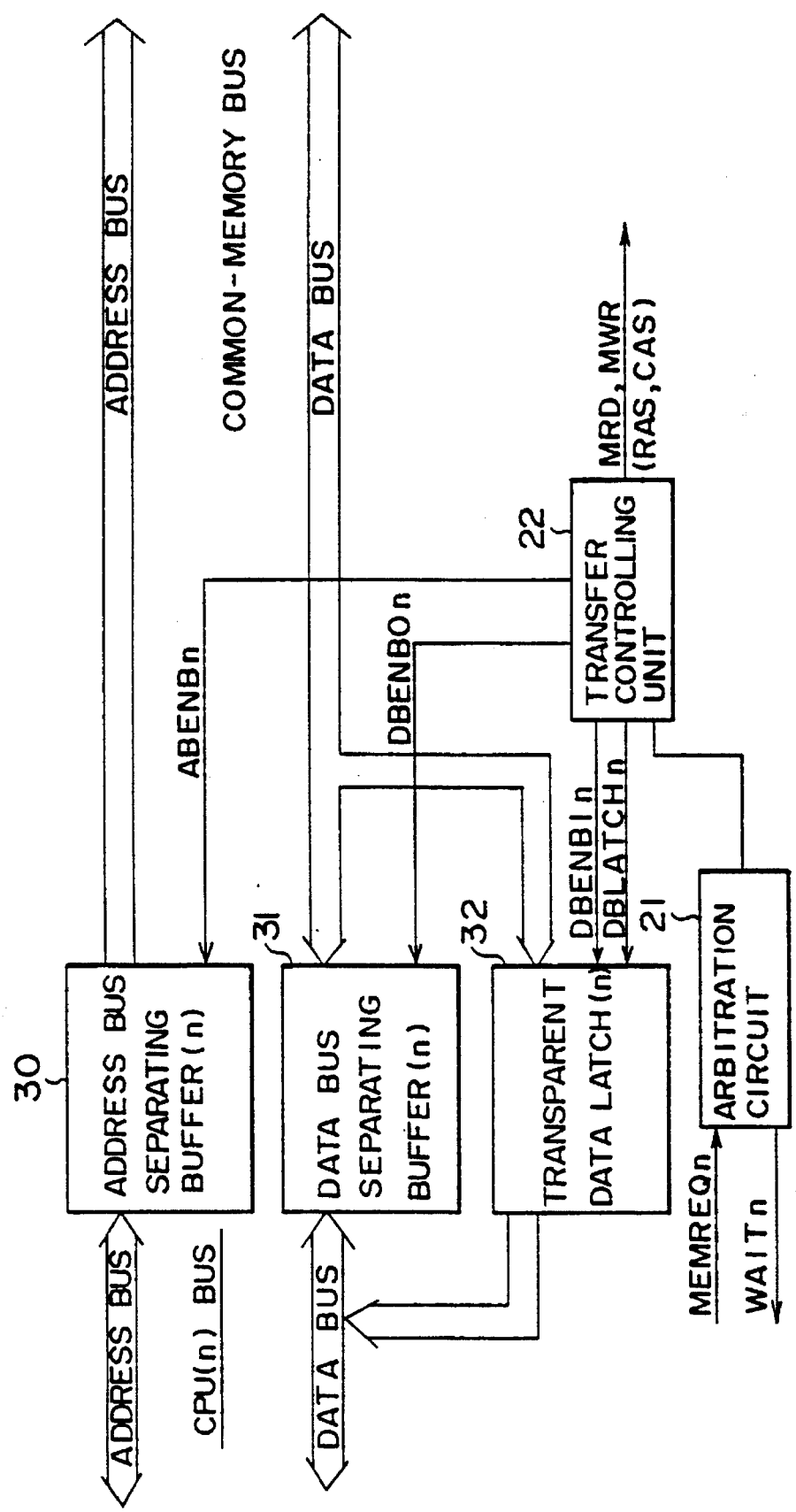
FIG. 2 is a block diagram showing a relationship between the arbitration circuit 21 and the transfer controlling circuit 22 shown in FIG. 1.

Fig.2 is a block diagram showing a relationship between the arbitration circuit 21 and the transfer controlling circuit 22.

As shown in FIG. 2, each of the bus separating means comprises an address bus separating buffer 30, a data bus separating buffer 31 and a transparent data latch 32.

When a data writing operation is performed, the address bus separating buffer 30 and the data bus separating buffer 31 are enabled by means of signals ABENB and DBENBO output by the transfer controlling unit 22, respectively. When the signals are supplied to the buffers 30 and 31, the CPU bus is connected to the common-memory bus for a predetermined period of time corresponding to one transfer cycle.

When a data reading operation is performed, the address separating buffer 30 and the transparent data latch 32 are enabled by means of signals ABENB and DBENBI output by the transfer controlling unit 22, respectively. After one transfer cycle has been completed, data is latched by the transparent data latch 32 in accordance with a signal DBLATCH, and then the transfer controlling unit 22 starts to assign a transfer cycle to the next CPU requesting for access to the common-memory 24.

Figure 3:
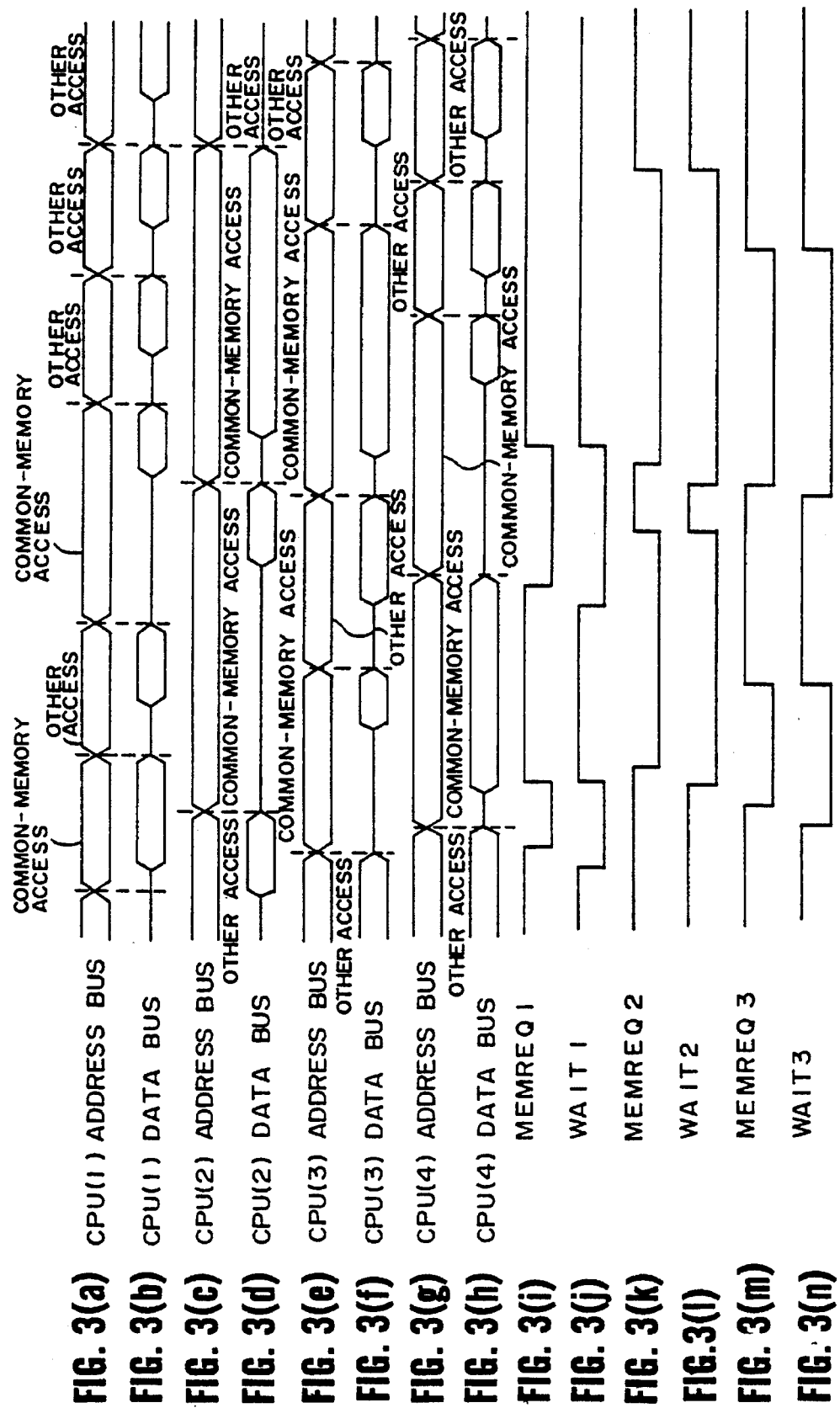
FIGS. 3(a)–3(n) are a part of a timing chart of an operation performed by the arbitration circuit 21 and the transfer controlling circuit shown in FIG. 1.
Figure 4:
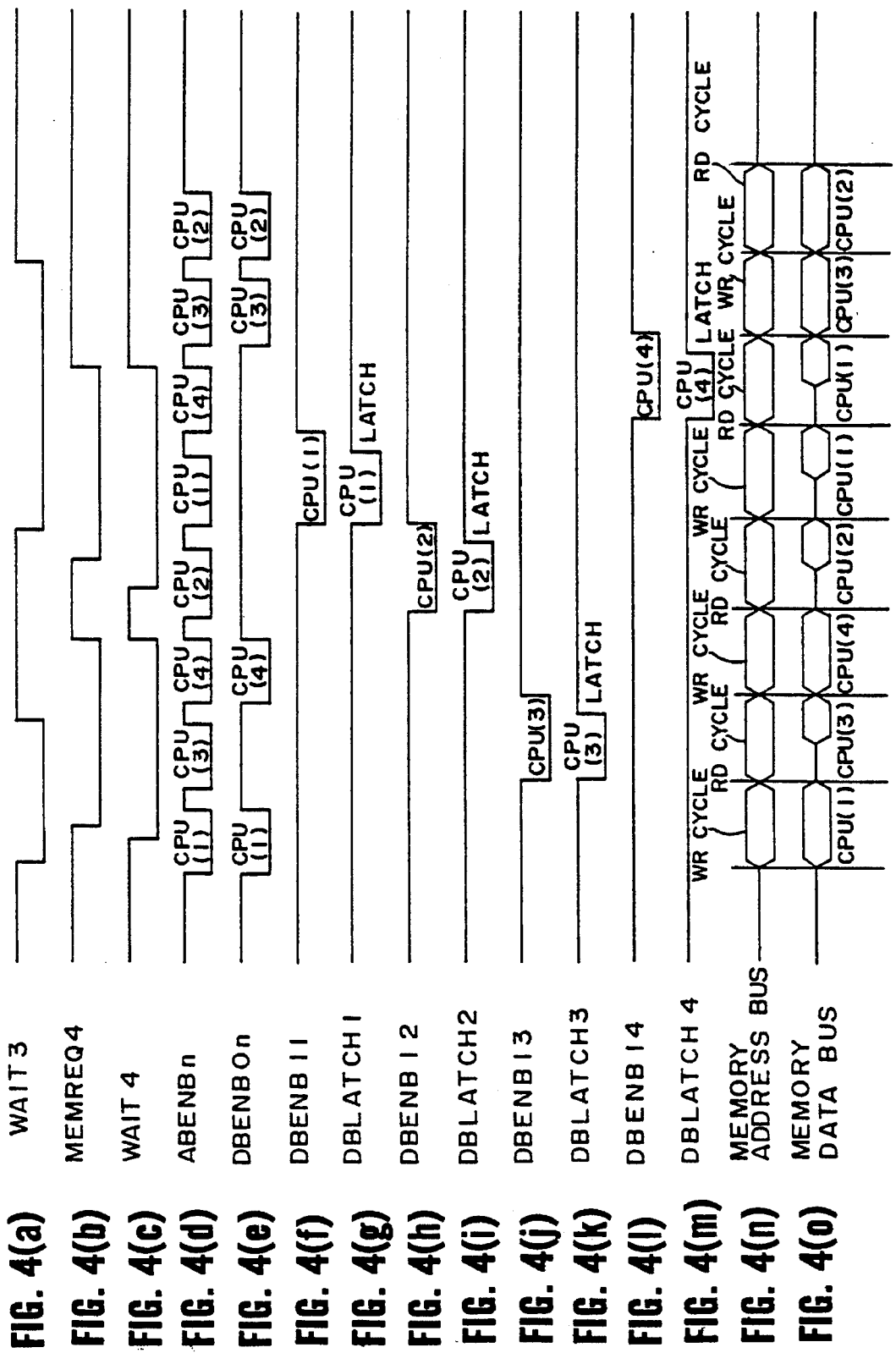
FIGS. 4(a)–4(o) are a parts of a timing chart of an operation performed by the arbitration circuit 21 and the transfer controlling circuit shown in FIG. 1.

FIGS. 3 and 4 are parts of a timing chart of an operation performed by the arbitration circuit 21 and the transfer controlling circuit. The signal WAIT3 shown at the bottom of FIG. 3 corresponds to the signal WAIT3 at the top of FIG. 4. In FIG. 3, "other access" means an access performed to a peripheral devices other than the common-memory 24.

A description will now be given, with reference to FIGS. 3 and 4, of an operation of the present embodiment.

When the signal WAIT1 is switched to be inactive after the request for the access to the common-memory 24 is accepted, the signal MEMREQ1 is switched to be inactive by the common-memory request signal generating circuit 2. During the service time according to the signal MEMREQ1, the signals ABENB1 and DEBENBO1 are in the active state, and thus the address bus and the data bus of the CPU(1) bus are connected to the common-memory bus. During this service time corresponding to one cycle, a controlling signal MWR or RAS/CAS is output from the transfer controlling unit 22 so as to perform a data writing operation to the common-memory 24.

During the access performed by the CPU(1), another request for access to the common-memory 24 is made by the CPU(3). In this case, as mentioned above, a signal WAIT3 is supplied from the arbitration circuit 21 to the CPU(3) and the common-memory request signal generating circuit 12. Because the service to the CPU(1) is still continued at this moment, the service to the CPU(3) is delayed until the service to the CPU(1) has been completed. Accordingly, the signal WAIT(3) is inactive until the service to the CPU(1) has been completed.

When the service to the CPU(1) is completed, a service corresponding to the signal MEMREQ3 is started. It should be noted, in the present case, since an operation to be performed with the CPU(3) is a data reading operation, address data is output from the CPU(3) to the common-memory bus according to the signal DBENB3, and data read from the common-memory 24 is transferred to the CPU(3) bus according to the DBENBI3. At this time, the data read from the common-memory 24 is temporarily stored in the transparent data latch 3 so as to prevent the common-memory bus from being occupied by the CPU(3) until the data is input to the CPU(3).

Operations similar to the above-mentioned operation are repeated for the requests for access from each of the CPUs.

As mentioned above, in the present embodiment, the common-memory 24 is shared with a plurality of CPUs 1, 6, 11 and 16. The CPU bus connected to each of the CPUs 1, 6, 11 and 16 is separated, when data transfer is performed with the common-memory 24, from the common-memory bus connected to the common-memory bus 24 by means of the corresponding bus separating means 3, 8, 13 and 18. The request signal is generated, when each of the CPUs intends to make an access to the common-memory 24, by the common-memory request signal generating circuits 2, 7, 12 and 17 corresponding to each of the CPUs. The requests for access to the common-memory 24 made by the CPUs 1, 6, 11 and 16 are arbitrated by the arbitration circuit 21. Only the timing control signals (ABENBn, DBENBOn, DBLATCHn, DBENBIn and DBLATCHn) are generated, when the access to the common-memory 24 by each of the CPUs is performed, by the transfer controlling unit 22. Accordingly, the CPUs 1, 6, 11 and 16 can perform, when making an access to the common-memory 24, an indirect access to the common-memory 24 via the transfer controlling unit 22.

Thanks to the above-mentioned indirect access, the access time is not affected even though a CPU having a relatively slow processing speed is included in the CPUs connected to the common-memory 24, and thus a waiting time for accessing to the common-memory 24 is minimized.

A description will now be given of a second embodiment according to the present invention. The structure of the second embodiment is the same as that shown in FIG. 1 except that the second embodiment has an upper address converting circuit on the common-memory bus.

Figure 5:
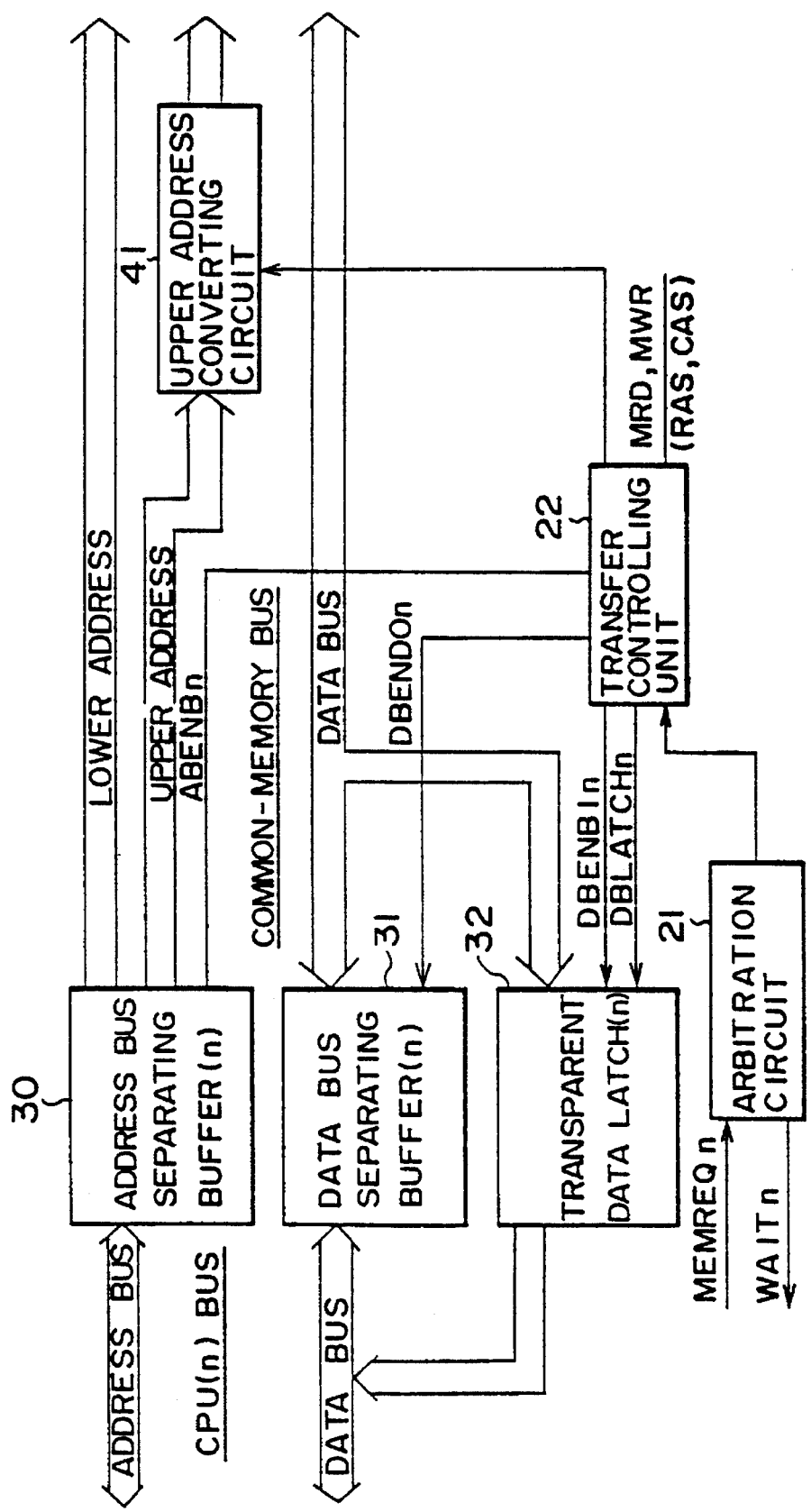
FIG. 5 is a block diagram showing a relationship between the arbitration circuit, the transfer controlling circuit and an upper address converting circuit of a second embodiment according to the present invention.

FIG. 5 is a block diagram showing a relationship between the arbitration circuit 21, the transfer controlling circuit 22, the upper address converting circuit 41 of the present embodiment. As shown in the figure, the upper address converting circuit 41 is added to the circuit structure shown in FIG. 2.

Figure 6:
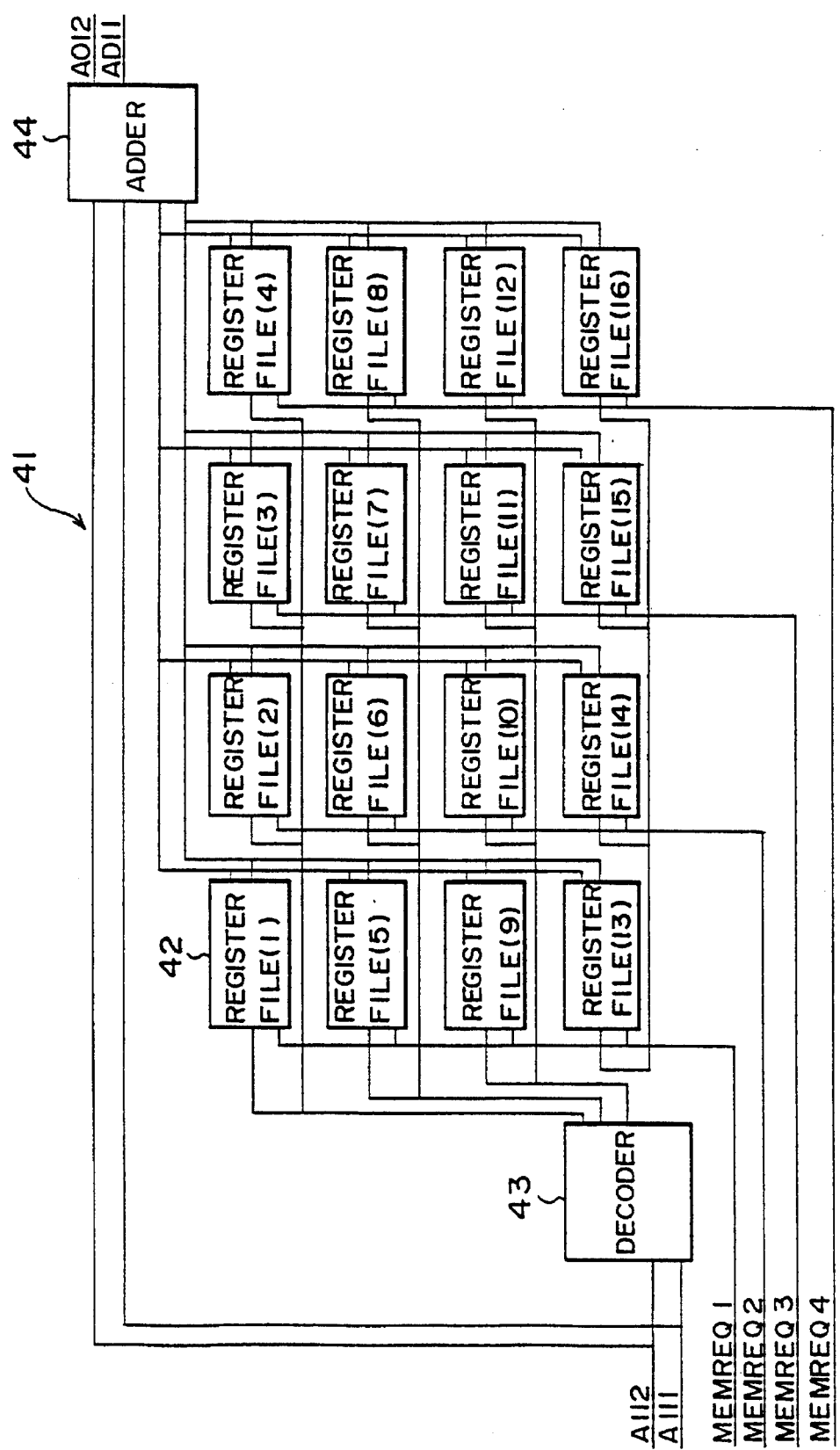
FIG. 6 is a circuit diagram of the upper address converting circuit shown in FIG. 5.

FIG. 6 is a circuit diagram of the upper address converting circuit 41. The upper address converting circuit 41 comprises sixteen register files 42, a decoder 43 and an adder 44.

Register files (1), (5), (9) and (13) are provided for setting address data used by the CPU(1) 1. Register files (2), (6), (10) and (14) are provided for setting address data used by the CPU(2) 6. Register files (3), (7), (11) and (15) are provided for setting address data used by the CPU(3) 11. Register files (4), (8), (12) and (16) are provided for setting address data used by the CPU(4) 16.

Each of the register files comprises a 2-bit latch, and is capable of setting data supplied by the CPUs. It should be noted that the data bus connected to the CPUs is not shown in FIG. 6.

In FIG. 6, signals AI11 and AI12 correspond, respectively, to the 11th digit bit and the 12th digit bit of the address data used in a memory area of each of the CPUs. The signals AO11 and AO12 correspond to the 11th digit bit and the 12th digit bit of the address data used in the common-memory 24. One of the register files (1) to (16) is selected according to the signals AI11 and AI12 and the signals MEMREQ1 to MEMREQ4 as described below. The signals AI11 and AI12 are selectively supplied to the register files 42 via the decoder 43. The request signal MEMREQ1 to MEMREQ4 are also selectively supplied to the register files 42.

If both signals AI11 and AI12 are 0, the signals AI11 and AI12 are supplied only to the register files (1) to (4). If the signal AI11 is 1 and AI12 is 0, the signals AI11 and AI12 are supplied only to the register files (5) to (8). If the signal AI11 is 0 and AI12 is 1, the signals AI11 and AI12 are supplied only to the register files (9) to (12). If both signals AI11 and AI12 are 1, the signals AI11 and AI12 are supplied only to the resister files (13) to (16). Additionally, the signal MEMREQ1 is supplied only to the register files (1), (5), (9) and (13). The signal MEMREQ2 is supplied only to the register files (2), (6), (10) and (14). The signal MEMREQ3 is supplied only to the register files (3), (7), (11) and (15). The signal MEMREQ4 is supplied only to the register files (4), (8), (12) and (16). In the above-mentioned structure, only one of the register files (1) to (16) are turn to be active to which the signals AI11 and AI12 and one of the signals MEMREQ1 to MEMREQ4 are supplied at the same time.

An output of each of the register files is always in the high-impedance state, and only the selected register file outputs predetermined bit signals AD11 and AD12. The signals AD11 and AD12 are input to the adder 44, and then added to the signals AI11 and AI12, respectively, so that signals AO11 and AO12 are generated.

Figure 7:
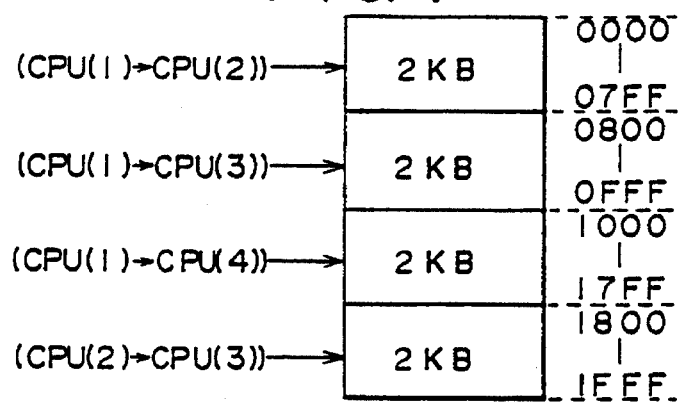
FIG. 7 is an illustration of a memory space of the common-memory shown in FIG. 1.

FIG. 7 is an illustration of a memory space of the common-memory 24. As shown in FIG. 7, a 2-KB memory space having addresses (0000–07FF) is used for data transferred between the CPU(1) and the CPU(2). A 2-KB memory space having addresses (0800–0FFF) is used for data transferred between the CPU(1) and the CPU(3). A 2-KB memory space having addresses (1000–17FF) is used for data transferred between the CPU(1) and the CPU(4). A 2-KB memory space having addresses (1800–1FFF) is used for data transferred between the CPU(2) and the CPU(3).

Figure 8:
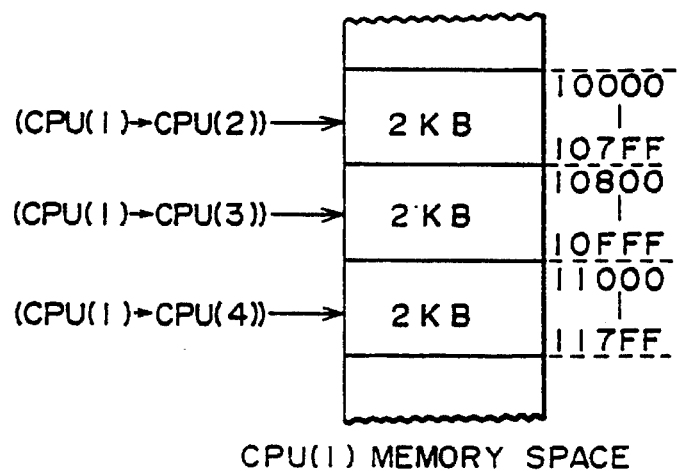
FIG. 8 is an illustration of a part of a memory space of one of the CPUs shown in FIG. 1.

FIG. 8 is an illustration of a part of a memory space of the CPU 1. As shown in FIG. 8, a 2-KB memory space having addresses (10000–107FF) is used for transferring data from the CPU(1) to the CPU(2). A 2-KB memory space having addresses (10800–10FFF) is used for transferring data from the CPU(1) to the CPU(3). A 2-KB memory space having addresses (11000–117FF) is used for transferring data from the CPU(1) to the CPU(4).

Figure 9:
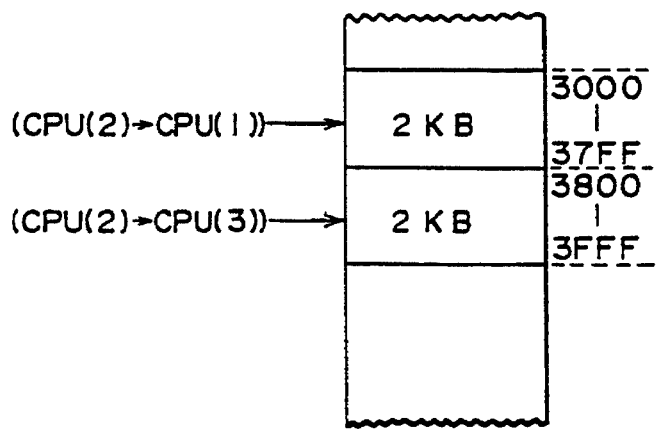
FIG. 9 is an illustration of a part of a memory space of one of the CPUs shown in FIG. 1.

FIG. 9 is an illustration of a part of a memory space of the CPU 6. As shown in FIG. 9, a 2-KB memory space having addresses (3000–37FF) is used for transferring data from the CPU(2) to the CPU(1). A 2-KB memory space having addresses (3800–3FFF) is used for transferring data from the CPU(2) to the CPU(1).

FIG. 10 is an illustration of a part of a memory space of the CPU 11. As shown in FIG. 10, a 2-KB memory space having addresses (1000–17FF) is used for transferring data from the CPU(3) to the CPU(1). A 2-KB memory space having addresses (1800–1FFF) is used for transferring data from the CPU(3) to the CPU(2).

FIG. 11 is an illustration of a part of a memory space of the CPU 16. As shown in FIG. 11, a 2-KB memory space having addresses (5000–57FF) is used for transferring data from the CPU(4) to the CPU(1).

As mentioned above, with reference to FIGS. 7 through 11, the addresses of the memory space of the common-memory 24 assigned to the corresponding CPUs are not the same as that of the corresponding CPUs 1, 6, 11 and 16. Accordingly, it is necessary to change address data corresponding to data to be transferred from each of the CPUs 1, 6, 11 and 16 to the common-memory 24.

FIG. 12 is an illustration showing an address conversion table representing a matrix of input address data AI12 and AI11 and output address data AO12 and AO11. Each of the register files 42 shown in FIG. 6 is operated in accordance with the conversion table.

A description will now be given of an address converting operation.

A description will now be given of a detail of the address conversion according to the conversion table shown in FIG. 12 with reference to the memory space of the CPU(2) shown in FIG. 9. As shown in FIG. 9, when transferring data from the CPU(2) to the CPU(1), the memory space of the CPU(2) having the addresses (3000–37FF) is used. These addresses must be converted into the addresses (0000–07FF) of the common-memory 24. That is, for example, the address "3000" of the CPU(2) must be converted into the address "0000" of the common-memory 24. The address "3000" is represented by (001 0000 0000 0000) in binary coded hexadecimal notation. Accordingly, the signal AI12 is equal to 1 and the signal AI11 is equal to 0 as indicated by the under lines.

AI12=1, AI11=0

It should be noted that, in the present embodiment, the address bus does not have a memory space corresponding to the digits higher than the 12th digit, and thus the digits higher than the 12th digit are ignored.

In order to obtain the address "0000" of the common-memory 24 which address is represented by (000 0000 0000 0000) in binary coded hexadecimal notation, both the signals AO12 and AO11 must converted into 0. That is, the signals AI12 and AI11 must be converted into 0 by adding the data AD12 and AD11, respectively. If "10" in the binary coded notation is added to "10" in the binary coded notation, the result is "100". The figure "00" can be obtained by taking the lowest two digits of "100". Therefore, in this case, the data AD12 should be equal to 1 and the signal AD11 should be equal to 0 as shown in conversion table of FIG. 12.

AD12=1, AD11=0

In this case, data can be transferred from the CPU(2) to the CPU(1) by setting data AD12 and AD11 in the register file (10) because the register file (10) is selected according to the signals AI11 and AI12 and the signal MEMREQ2.

It should be noted that the address conversion table represents data to be set in the register files at the time when mapping of the memory of each of the CPUs is determined.

FIGS. 13A through 13D show the data AD12 and AD11 to be set in the register files 42 in a case where the mapping is performed by the upper address converting circuit 41 shown in FIG. 6.

The register files (1), (5), (9) and (13) shown in FIGS. 13A through 13D are used for the memory space of the CPU(1); the register files (2), (6), (10) and (14) are used for the memory space of the CPU(2); the register files (3), (7), (11) and (15) are used for the memory space of the CPU(3); the register files (4), (8), (12) and (16) are used for the memory space of the CPU(4). It should be noted that "X" in the figures represents that the corresponding conditions never happen in the present case.

The setting values shown in FIGS. 13A through 13D correspond to addresses assigned to the memory space of the common-memory 24 shown in FIG. 7.

In the present embodiment, as mentioned-above, the address data of each of the CPUs are logically converted into the address data used for the common-memory 24 by adding the data in the register files with the address data of each of the CPUs. Accordingly, the memory space of the common-memory 24 can be mapped for each of the CPUs, a memory space corresponding to each of the CPUs having consecutive addresses. Therefore, the memory area of the common-memory 24 can be used efficiently.

Figure 14:
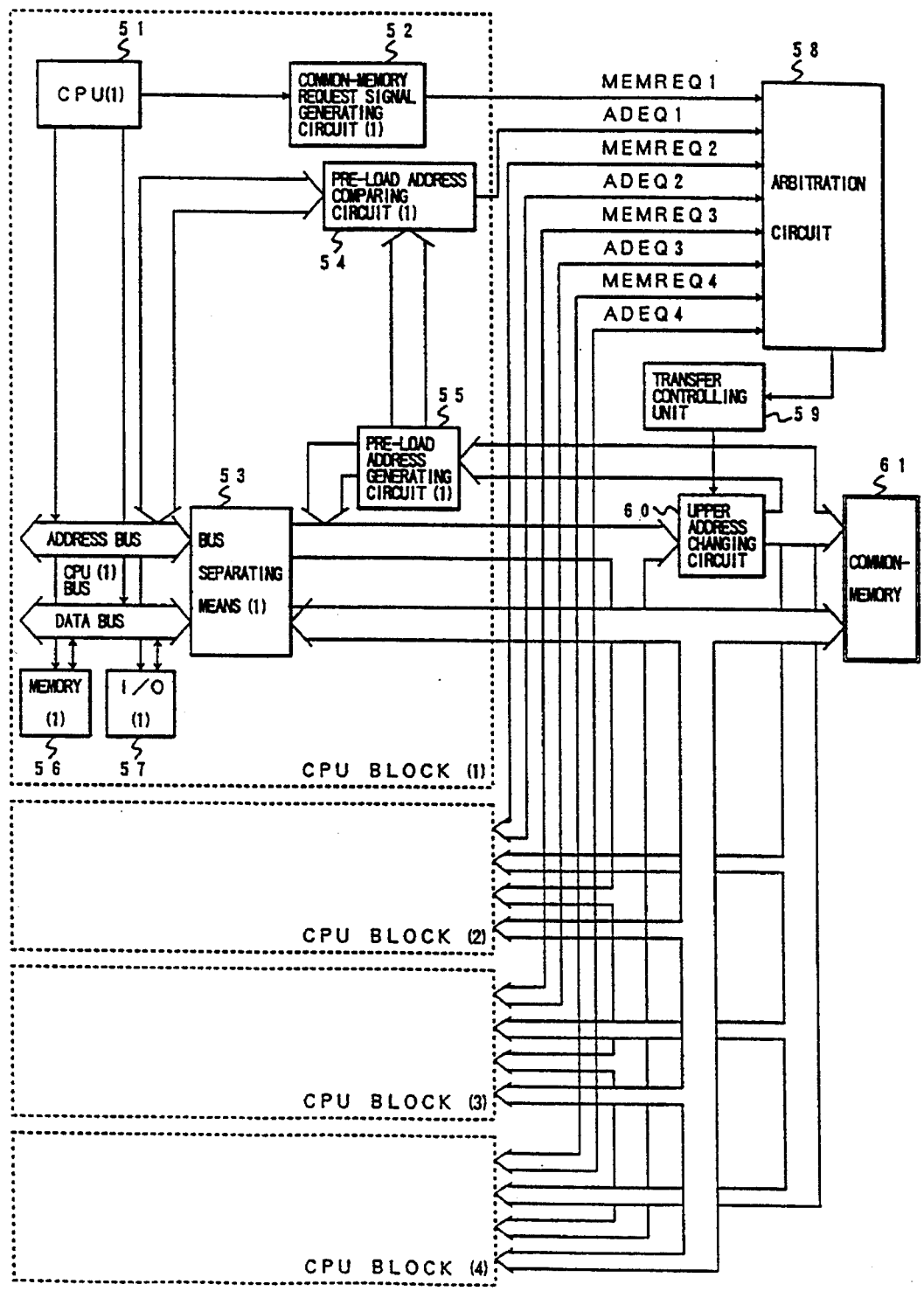
FIG. 14 is a block diagram of a third embodiment of a common-memory controlling apparatus according to the present invention.

A description will now be given of a third embodiment of a common-memory controlling apparatus according to the present invention. FIG. 14 is a block diagram of the third embodiment of a common-memory controlling apparatus according to the present invention.

As shown in FIG. 14, the third embodiment comprises four CPU blocks (1) to (4), an arbitration circuit 58, transfer controlling circuit 59, an upper address converting circuit 60 and a common-memory 61. The arbitration circuit 58, the transfer controlling unit 59, the upper address converting circuit 60 and the common-memory 61 correspond to those of the second embodiment, respectively, and descriptions thereof will be omitted.

The CPU block (1) comprises a CPU(1) 51, a common-memory request signal generating circuit 52, bus separating means 53, a memory 56 and I/O unit 56, each functions the same as those of the above mentioned first embodiment, and description thereof will be omitted. The CPU (1) block further comprises a pre-load address comparing circuit (1) 54 and a pre-load address generating circuit 55. The pre-load address comparing circuit (1) 55 is provided for generating a pre-load address data used by the CPU(1). The pre-load comparing circuit (1) 54 compares address data of the common-memory 58 with the pre-load address data. Detailed descriptions of the pre-load comparing circuit (1) 54 and the pre-load address generating circuit (1) 55 will be given later.

A structure of each of the CPU blocks (2) to (4) is the same as that of the CPU block (1), and descriptions thereof will be omitted.

Figure 15:
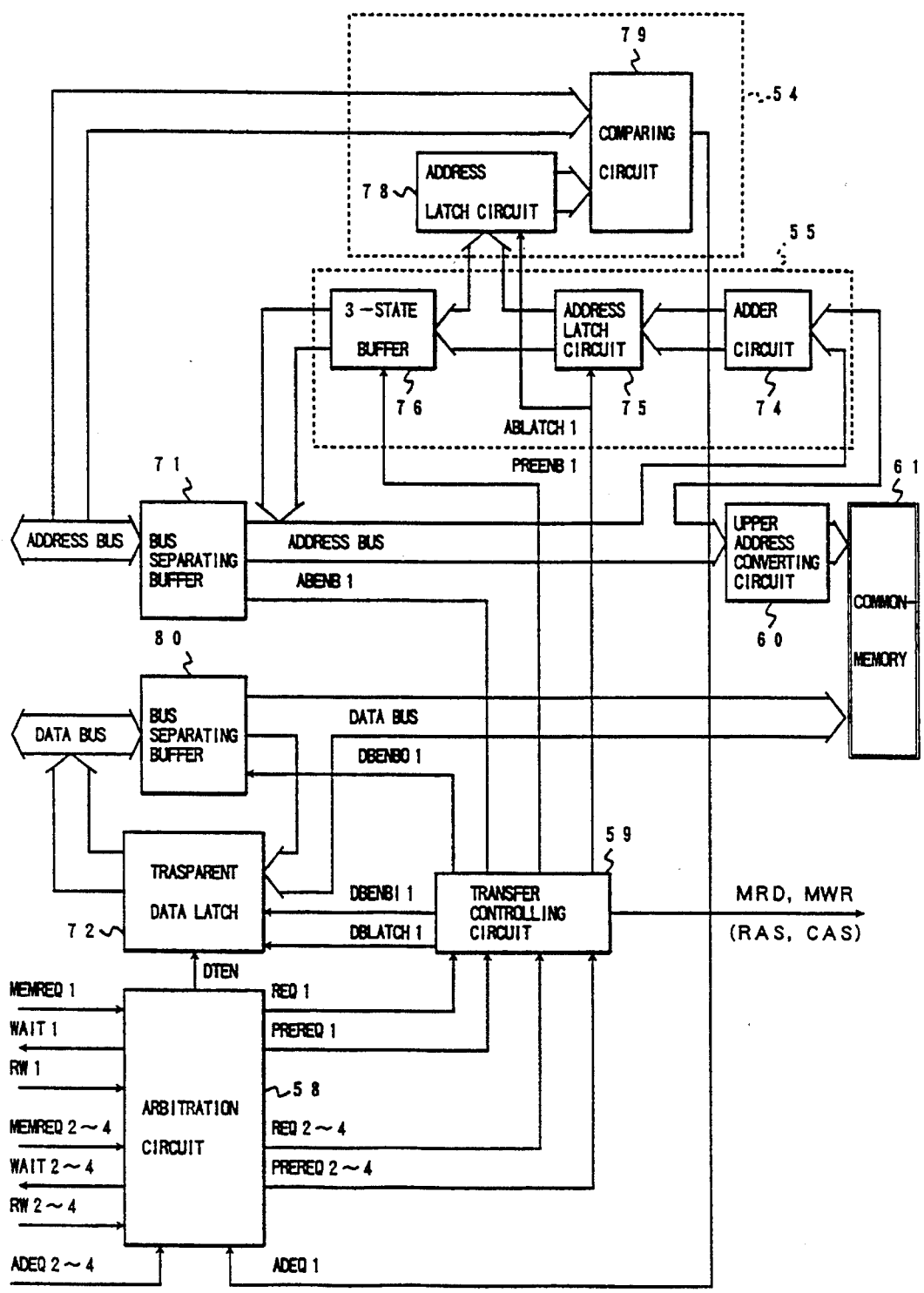
FIG. 15 is a detailed block diagram of a part of the common-memory controlling apparatus shown in FIG. 14.

FIG. 15 is a detailed block diagram of a part of the common-memory controlling apparatus shown in FIG. 14. The part of the common-memory controlling apparatus shown in FIG. 15 comprises the bus separating means (1) 53 comprising bus separating buffers 71 and 80 and a transparent data latch 72; the pre-load address comparing circuit (1) 54 comprising an address latch circuit 78 and a comparing circuit 79; the pre-load address generating circuit (1) 55 comprising an adder circuit 74, an address latch circuit 75 and a 3-state buffer 76; the upper address converting circuit 60; the transfer controlling unit 59; and the arbitration circuit 58.

A description will now be given of signals shown in FIG. 15.

Signals MEMREQ1 to MEMREQ4 and WAIT1 to WAIT4 are the same as those of in first embodiment.

Signals RW1 to RW4 are signals output from each of the CPUs in the CPU blocks (1) to (4), which signals represent a read/write state of the operation to be performed for the common-memory 61.

Signals REQ1 to REQ4 are signals converted from the signals MEMREQ1 to MEMREQ4, one of which is selected by the arbitration circuit 58. One of the signals REQ1 to REQ4 are input to the transfer controlling unit 59.

Signals PREREQ1 to PREREQ4 are signals for requesting pre-load address data being transferred from one of CPUs to the transparent data latch 72. The transfer of the pre-load address data is performed immediately after a data reading operation has been completed for one of the CPUs, on the assumption that a reading operation for data at the consecutive address in the common-memory 61 will be performed in the next operation.

Signals ABENB1 to ABENB4 are enable signals for enabling the connection between the address bus of each of the CPUs and the address bus of the common-memory bus when an access to the common-memory by one of the CPUs is performed.

Signals DBENBO1 to DEBENBO4 are enable signals for enabling the connection between the data bus of each of the CPUs and the data bus of the common-memory bus when a data writing operation on the common-memory 61 is performed by one of the CPUs.

Signals DBENBI1 to DEBENBI4 are enable signals for enabling the connection between the data bus of each of the CPUs and the data bus of the common-memory bus when a data reading operation on the common-memory 61 is performed by one of the CPUs.

Signals DBLATCH1 to DEBLATCH4 are latch signals for latching the data on the data bus of the common-memory bus into the transparent data latch 72 when a data reading operation on the common-memory is performed by one of the CPUs.

Signals ABLATCH1 to ABLATCH4 are latch signals for latching pre-load address data, which value has been incremented 1 or 2 by the adder circuit, into an address latch circuit when a data read operation on the common-memory 61 and a pre-load cycle operation are performed.

Signals PREENB1 to PREENB4 are enable signals for enabling the transfer of the address data generated by the pre-load address generating circuit 55 to the address bus of the common-memory 61 during the pre-load cycle. When these signals PREENB1 to PREENB4 are in the active state, the signals ABENB1 to ABENB4 are in the inactive state.

Figure 16:
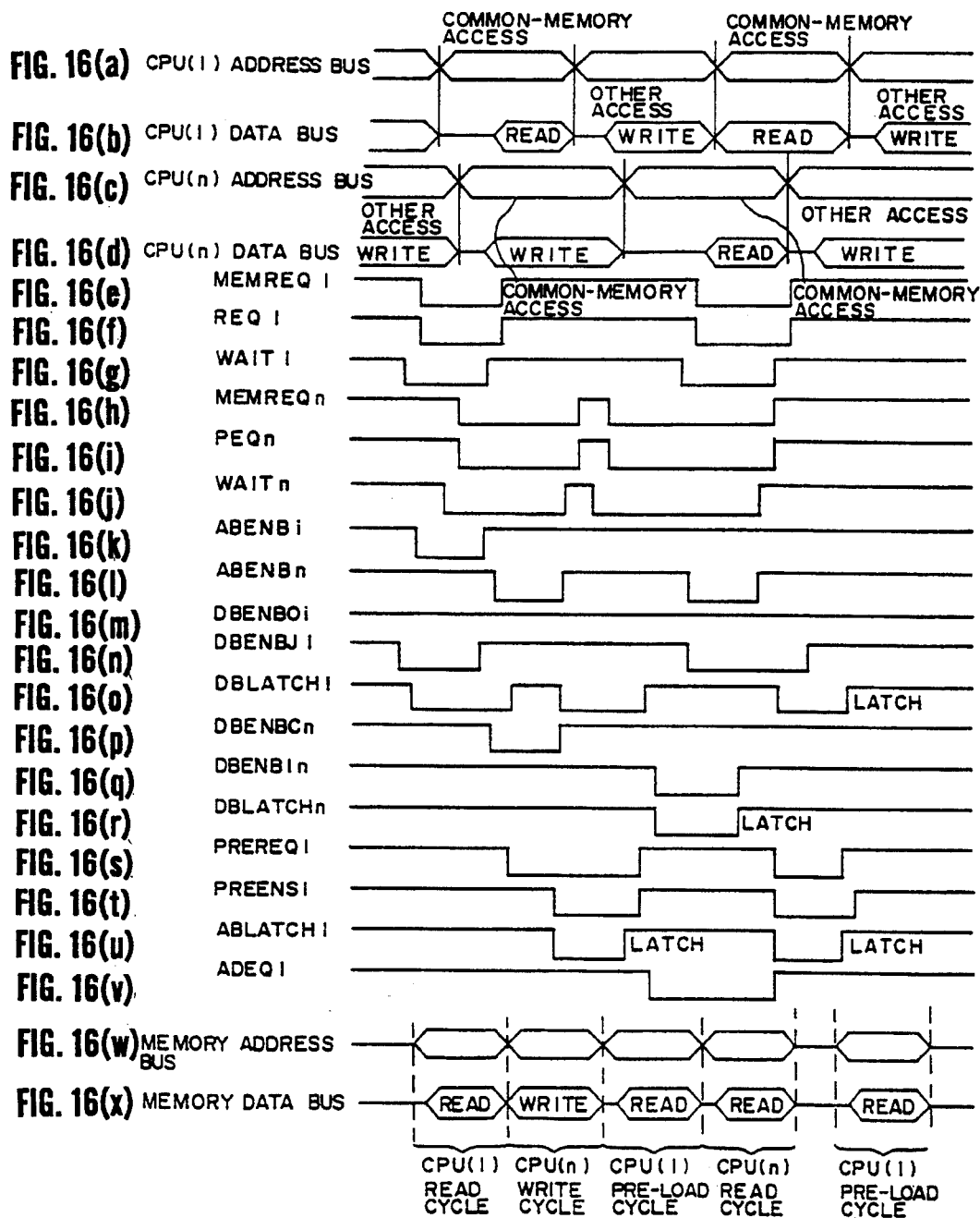
FIGS. 16(a)–16(x) are a timing chart of an operation performed in the third embodiment shown in FIGS. 14 and 15.

A description will now be given, with reference to FIG. 16, of an operation of the third embodiment according to the present invention. FIG. 16 is a timing chart of an operation performed in the present embodiment shown in FIGS. 14 and 15.

As shown in FIG. 16, when a data reading operation for the CPU(1) is performed according to the signal MEMREQ1, the bus separating buffer 71 for the address bus and the transparent data latch 72 are turned to the active state by the signals ABENB1 and DEBENBI1, respectively. The transparent data latch 72 latches the data at a rising edge of the signal DEBLATCH1 after one cycle of the data reading operation, as a single transferring cycle of the transfer controlling unit 59, has been completed. At the same time, the pre-load address data is latched by the address latch circuit 75 at a rising edge of the signal ABLATCH1. The pre-load address data is generated in the adder circuit 74 by adding 1 or 2 to the address data used in the last data-reading operation.

After the single data-reading operation for the CPU(1) 51 has been completed, the signal PREREQ 1 is generated by the arbitration circuit 58. The signal PREREQ1 is the signal for requesting a data reading operation on the pre-load address data. The signal PREREQ1 is turned to the active state when the access from the CPU(1) to the common-memory 61 has finished. Priority levels of the generated signal PREREQ1, the signals MEMREQ2 to MEMREQ4 and other pre-load requesting signals are then arbitrated by the arbitration circuit 58.

When the pre-load cycle operation for the CPU(1) 51 is performed, the 3-state buffer 76 of the pre-load address generating circuit 55 is enabled by the signal PREEMB1. The data in the common-memory 61 designated by the pre-load address data latched by the address latch circuit 75 is latched by the transparent data latch 72 at a rising edge of the signal DEBLATCH1. At the same time, the address data used for the pre-load cycle is latched by the address latch circuit 78 at a rising edge of the signal ABLATCH1. Additionally, when the pre-load cycle is completed, the address data, which is generated by adding 1 or 2 to the address data of the common-memory 61 used in the pre-load cycle, is latched by the address latch circuit 75 at a rising edge of the signal ABLATCH1.

When there is an access for reading data in the common-memory by the CPU(1) 51 again, the address data of the CPU(1) 51 is compared with the address data in the address latch circuit 78. If the comparison result indicates that the address data of the CPU(1) is equal to the address data in the address latch circuit 78, the signals (MEMREQn) for requesting an access to the common-memory 61 are masked by the arbitration circuit 58. Additionally, the output of the transparent data latch 72 is turned to be inactive by means of a signal DETN output by the arbitration circuit 58 so as to release the CPU(1) 51 from the waiting state. After the single data-reading operation cycle has been completed, another request for a pre-load cycle for the CPU(1) is generated, and the above-mentioned operation is repeated.

On the other hand, if the comparison result indicates that the address data of the CPU(1) is not equal to the address data in the address latch circuit 78, a regular arbitration is performed on the accesses from the CPUs according to the signals PREREQ1 and the signals MEMREQ2 to MEMREQ4. After that, the address separating buffer 71 and the transparent data latch 72 for the data bus are turned in the active state so that the data on the data bus is latched by the transparent data latch 72 after one transfer cycle of the transfer controlling unit 59 has been completed. At the same time, the address data, which is generated by adding 1 or 2 to the address data of the common-memory 61 used in the last transfer cycle, is latched by the address latch circuit 75 at a rising edge of the signal ABLATCH1.

As mentioned above, in the present embodiment, when each of the CPUs performs an access to the common-memory 61, an indirect access can be performed through the data transfer unit 59. This construction can prevent time delay when a CPU having a relatively slow processing speed is included in the CPUs used with the common-memory 61, and thus a waiting time for each of the CPUs can be minimized. Additionally, because data at the addresses next to the address at which currently read data is stored in the common-memory 61 is transferred to and stored in the transparent data latch 72 beforehand, a speed of data reading operations performed on the data at the consecutive addresses in the common-memory 61 can be increased.

Additionally, since the present embodiment is provided with the upper address converting circuit 60 which functions the same as the upper address converting circuit described with regard to the above-mentioned second embodiment, the address data of each of the CPUs is logically converted into the address data used for the common-memory 61 by combining the data in the register files with the address data of each of the CPUs. Accordingly, the present embodiment has effects the same as that of the second embodiment with regard to the efficiency of use of the memory area in the common-memory 61.

Figure 17:
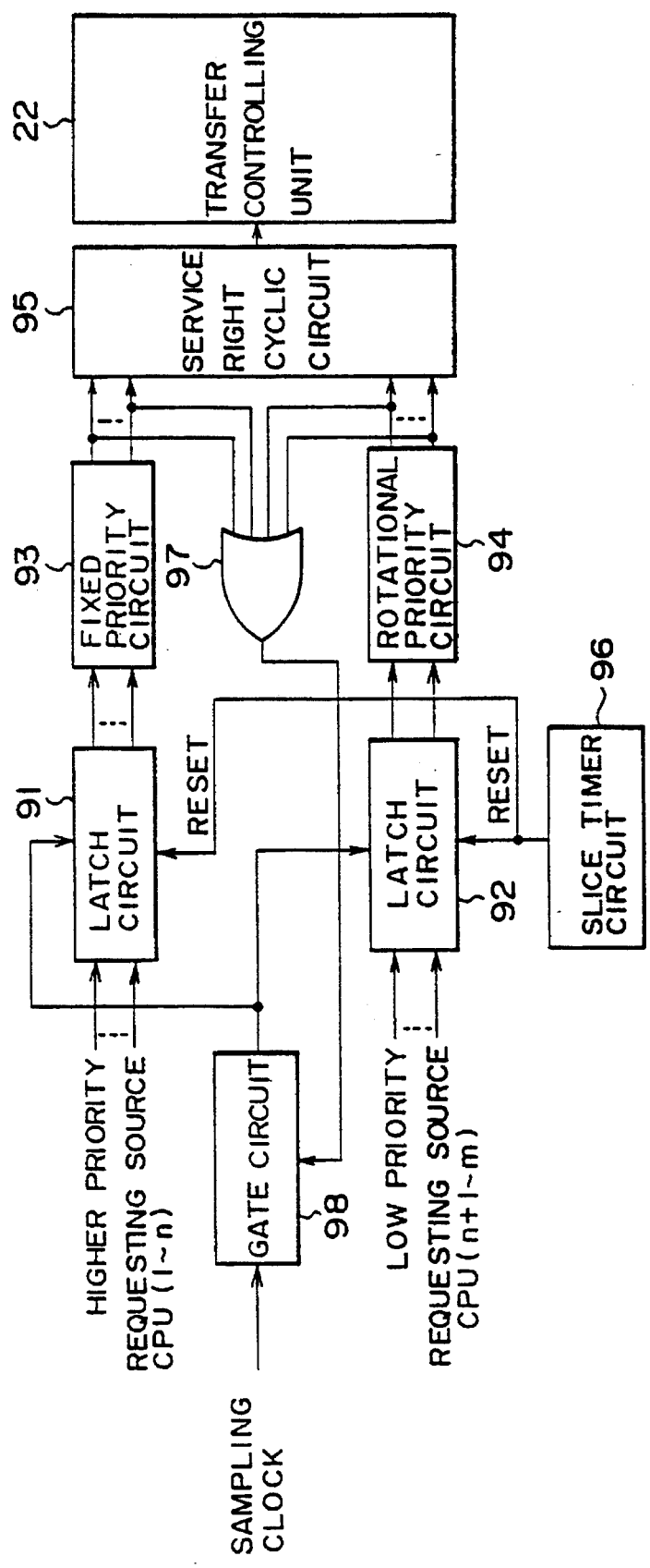
FIG. 17 is a block diagram of an essential part of a fourth embodiment according to the present invention.

A description will now be given, with reference to FIG. 17, of a fourth embodiment of a common-memory controlling apparatus according to the present invention. FIG. 17 is a block diagram of an essential part of the fourth embodiment according to the present invention. It should be noted that the present embodiment uses the same construction as that described with regard to the first embodiment with reference to FIG. 1 except that an arbitration circuit of the present embodiment has different structure from that of the arbitration circuit 21 of the first embodiment. It should be noted that although the present embodiment uses six CPUs while the first embodiment uses four CPUs, there is no difference in the effects and advantages between the present embodiment and the first embodiment.

As shown in FIG. 17, the arbitration circuit of the present embodiment comprises latch circuits 91 and 92, a fixed priority circuit 93, a rotational priority circuit 94, a service right cyclic circuit 95, a slice timer circuit 96, an OR gate 97 and a gate circuit 98.

The latch circuits 91 and 92 latch two signals for requesting an access to the common-memory. One signal of the two signals is supplied by CPUs having a high priority level, and the other by CPUs having a low priority level. The arbitration circuit do not perform a sampling operation until operations corresponding to latched signals are completed or until a reset signal is supplied from the slice timer circuit 96. That is, a sampling clock input to the gate circuit 98 is stopped when at least one signal for requesting an access to the common-memory is latched in the OR gate 98 in accordance with a result of an OR operation performed by the OR gate on outputs from the latch circuits 91 and 92.

The signal MEMREQn for requesting an access to the common-memory latched by the latch circuit 91 is arbitrated in accordance with a fixed priority system by the fixed priority circuit 93, and the signal MEMREQn latched by the latch circuit 92 is arbitrated in accordance with a rotational priority system by the rotational priority circuit 94.

The service right cyclic circuit 95 generates various signals used for performing services of which priority level is determined by the priority circuits 93 and 94. The slice timer circuit 96 performs a count down from a predetermined value, and outputs the reset signal to the latch circuits 91 and 92 when the count down value reaches 0 (time out). The slice timer circuit 96 repeats this count down operation.

The latch circuits 91 and 92 reset the latched signals MEMREQn according to the reset signal supplied by the slice timer circuit 96. This sampling operation of the arbitration circuit is repeated. When the count down operation times out during service operation corresponding to a request for access to the common-memory, the signals MEMREQn in the latched circuits 91 and 92 are reset after the service operation has been completed.

Figure 18:
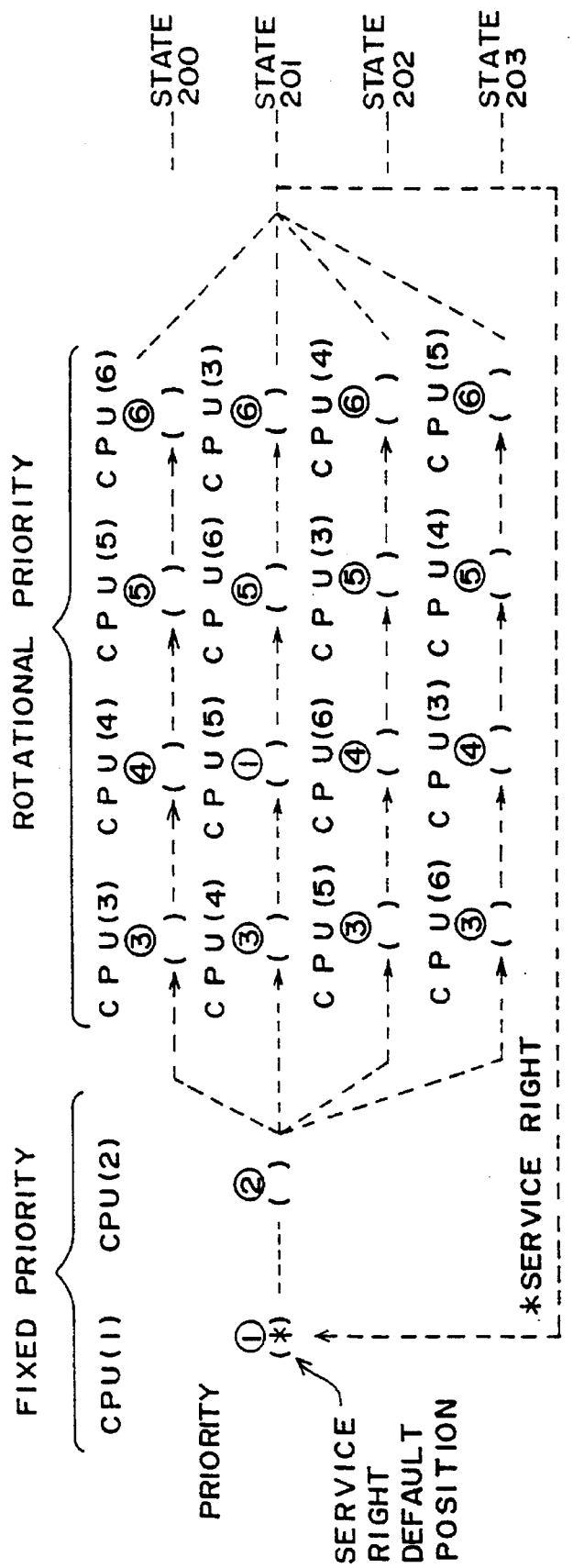
FIG. 18 is an illustration for explaining a transfer of a service right in the fourth embodiment according to the present invention.

A description will now be given of a transfer of a service right. FIG. 18 is an illustration for explaining a transfer of a service right in the fourth embodiment. FIG. 18 shows how a service right for a request for access to the common-memory is transferred.

In FIG. 18, (*) refers to a service right which is transferred in accordance with a priority level determined by a rotational priority. The service right (*) is not transferred to a request for an access to the common-memory, the request signal is not latched by the latch circuits 91 and 92. The service right (*) is forced to return to the CPU(1), as an initial state, each time the slice timer circuit times out. Also, the service right (*) is forced to return to the CPU(1) when a request signal for accessing to the common-memory is latched by the latch circuit 91 or 92. However, even though the service right is returned to the initial state, the priority level of the rotational priority is maintained unchanged. The priority level of the rotational priority changes when a request for access to the common-memory, which request has a rotational priority, is served.

Figure 19:
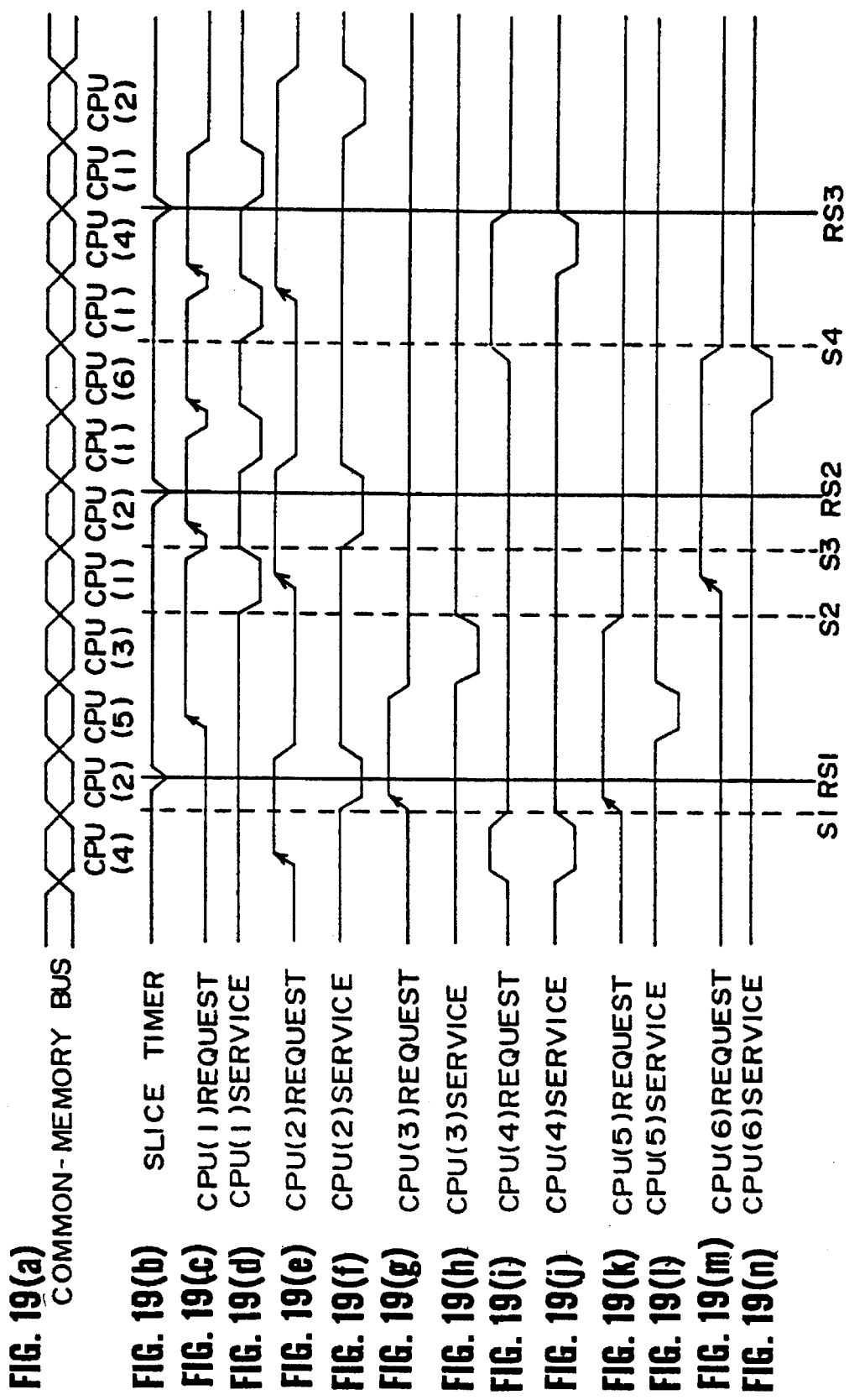
FIGS. 19(a)–19(n) are a timing chart of an operation performed in the fourth embodiment according to the present invention.

FIG. 19 is a timing chart of an operation performed in the present embodiment. In the present embodiment, the CPUs (1) and (2) are higher priority requesting sources, and the CPUs (3) to (6) are lower priority requesting sources. The sampling performed on request signals for access to the common-memory is always performed when the request, the request signal of which is not latched by the latch circuit 91 or 92, is being served. In FIG. 19, S1 to S4 represent a timing at which at least one request signal for access to the common-memory is latched. RS1 to RS3 represent a timing at which the slice timer circuit 96 times out and latch circuits 91 and 92 are reset so as to perform a sampling of request signals. The following operation starts from a state (202) of the priority order.

First, request signal from the CPU(2) is latched at S1 since only the request for access to the common-memory made by the CPU(2) is in the active state. Accordingly, the CPU(2) is served first. Since the CPU(2) is assigned as a higher priority requesting source, the priority order state of the rotational priority shown in FIG. 18 remains to be the state (202). This is because the priority order of the rotational priority does not change in a case where non of the CPUs assigned as a lower priority requesting source is served.

At RS1, since the slice timer times out during service to the CPU2, the request signal of the CPU(2) is reset after the service to the CPU(2) has been completed. In this case, since only the CPU(2) was latched, there is no other request signal which is reset by the resetting operation. After the reset of the latches, a sampling is performed so as to latch other request signals in the latches 91 and 92. It should be noted that the state of the priority order of the rotational priority remains unchanged since the CPU(2) is not included in the CPUs controlled by the rotational priority.

When the sampling is performed at RS1, request signals from the CPU(3) and the CPU(5) are active. Accordingly, the request signals from the CPU(3) and the CPU(5) are latched by the latch circuits 91 and 92, and then an arbitration is performed on the request signals. In this case, since the priority order is in the state (202) shown in FIG. 18, the CPU(5) and the CPU(3) are served in this order. Since the service is performed according to the rotational priority, the priority order of the rotational priority is rotated to the state (203) after the service to the CPU(5) has been completed, and to the state (200) after the service to the CPU(3) has been completed. Another sampling is then performed so as to latch request signals in the latches 91 and 92 using the sampling clock signal.

When the service to the CPU(3) is completed at S2, a sampling is performed again to latch request signals. In this case, since only the request signal made by the CPU(1) is in the active state, the service to the CPU(1) is performed. After the service to the CPU(1) has been completed, another sampling is performed. In this sampling, the request signals made by the CPU(2) and the CPU(6) are latched, at S3, by the latch circuits 91 and 92. Since the CPU(2) has a higher priority level, the CPU(2) is served first. During the service to the CPU(2), the slice timer circuit times out at RS2, and thus the latched request signal of the CPU(6) is reset. Another sampling is then performed on request signals including the request from the CPU(6). In this case, the request signals from the CPU(1) and the CPU(6) are latched. The CPU(1) and the CPU(6) are served in this order according to the priority level. After the service to the CPU(6) has been completed, the priority order is changed to the state (201).

After the service to the CPU(6) has been completed, a sampling is performed, at S4, on request signals, and the request signals from the CPU(1) and the CPU(4) are latched. Since the CPU(1) has a higher priority level, the CPU(1) is served first. After the service to the CPU(4) has been completed, the priority order is changed to the state (202). Immediately after the service to the CPU(4), the slice timer circuit times out at RS3, and thus the latched request signal is reset (in this case, there is no latched signal). Another sampling is then performed on request signals, and, the request signals from the CPU(1) and the CPU(2) are latched. The CPU(1) and the CPU(2) are served in this order according to the priority level.

As mentioned above, in the present embodiment, a service to each of the CPUs is performed according to the priority order including the fixed higher priority order system and the rotational priority system by latching the request signals by a single sampling performed on all request signals. Additionally, the sampling is repeated at a predetermined periods by means of slice timer circuit, and thus a service to the CPUs to which a fixed priority order is assigned is always performed at the predetermined periods.

Additionally, even though a sum of the periods for serving to the CPUs sampled by a single sampling operation is longer than the predetermined period determined by the slice timer circuit, the CPUs to which the rotational priority is assigned are equally served as described below.

In FIG. 19, in a case where the CPUs (1) to (6) frequently request accesses to the common-memory, the period of service to the CPUs may become longer than the period determined by the slice timer circuit. In such a case, if the priority order for the CPUs having a lower priority level is not cycled, only the CPUs having a relatively higher priority level among the lower priority CPUs are served because requests from the CPUs having a relatively lower priority level are reset before they are served. However, in the present embodiment, since the rotational priority system is used for the CPUs having a relatively lower priority level, the CPU having the lowest priority level is gradually incremented to a higher level according to the rotation of the priority order, and vice versa. Therefore, the CPUs to which the rotational priority is assigned are equally served.

A description will now be given, with reference to FIG. 20, of a fifth embodiment of a common-memory controlling apparatus according to the present invention. FIG. 27 is a block diagram of an essential part of the fifth embodiment according to the present invention. It should be noted that the present embodiment uses the same construction as that described with regard to the first embodiment with reference to FIG. 1 except that an arbitration circuit of the present embodiment has different structure from that of the arbitration circuit 21 of the first embodiment. It should be noted that although the present embodiment uses six CPUs while the first embodiment uses four CPUs, there is no difference in the effects and advantages between the present embodiment and the first embodiment.

Figure 20:
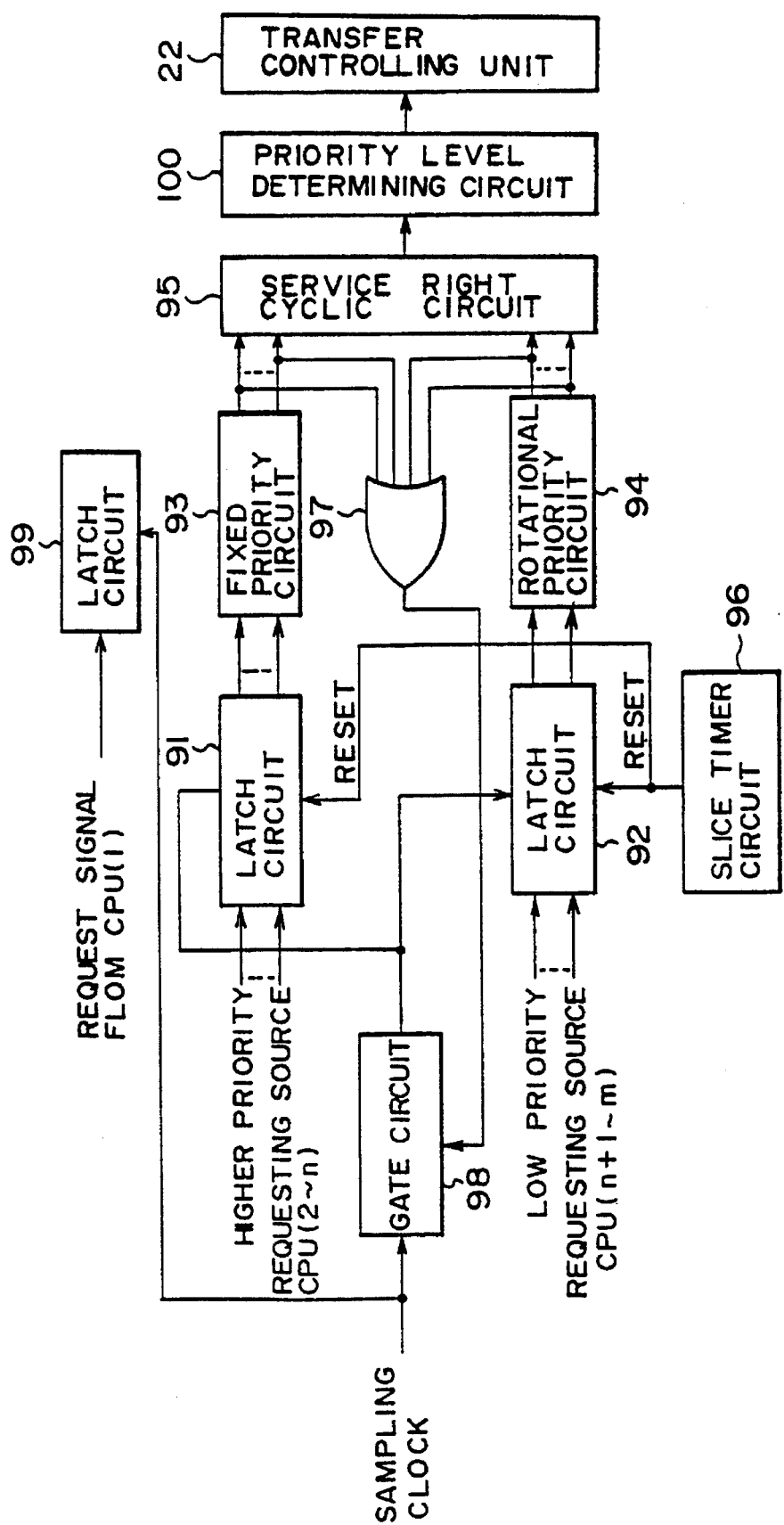
FIG. 20 is a block diagram of an essential part of a fifth embodiment according to the present invention.

As shown in FIG. 20, the arbitration circuit of the present embodiment comprises a latch circuit 99 and a priority level determining circuit in addition to the arbitration circuit of the above-mentioned fourth embodiment.

The latch circuit 99 latches a request signal from the CPU(1) and supplies it to the priority level determining circuit 100. In the present embodiment, the CPU(1) always has the highest priority level. The priority level determining circuit 100 determines whether or not the request from the CPU(1) is present. If the request from the CPU(1) is present, the priority level determining circuit 100 supplies the request signal from the CPU(1) to the transfer controlling unit 22. If the request form the CPU(1) is not present, the request signal supplied by the service right cyclic circuit 95 is sent to the transfer controlling unit 22.

Figure 21:
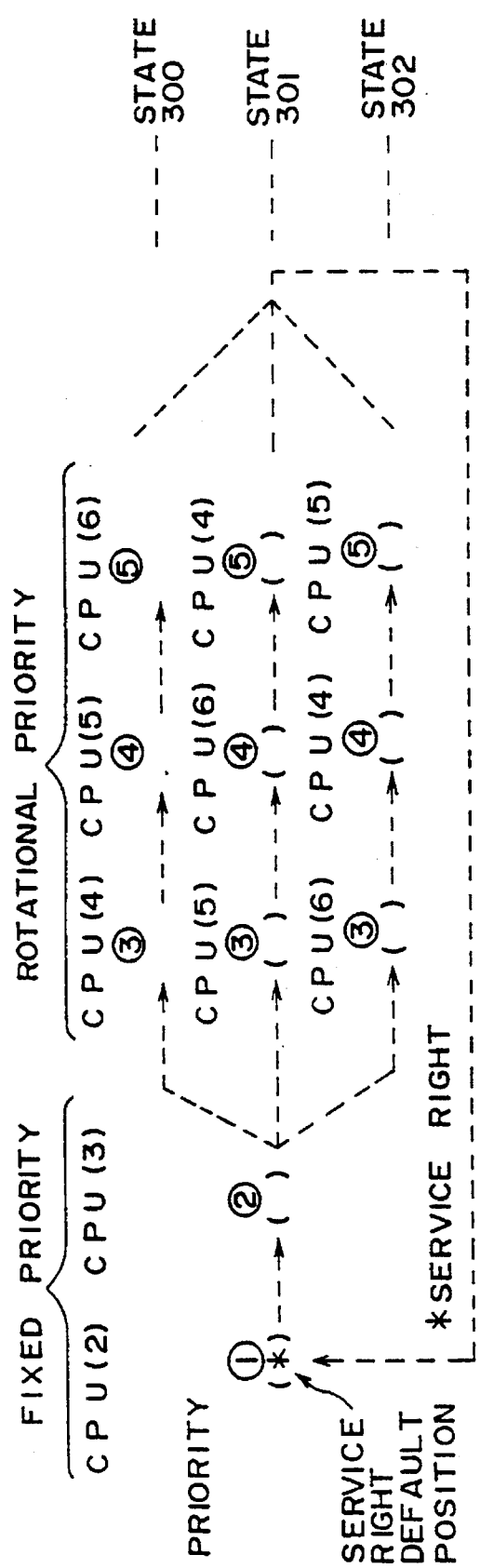
FIG. 21 is an illustration for explaining a transfer of a service right in the fifth embodiment according to the present invention.

A description will now be given of a transfer of a service right. FIG. 21 is an illustration for explaining a transfer of a service right in the fifth embodiment. FIG. 21 shows how a service right for a request for access to the common-memory, of which request signal is latched by the latch circuits 91 or 92, is transferred.

In FIG. 21, (*) refers to a service right which is transferred in accordance with a priority level determined by a rotational priority. The service right (*) is not transferred to CPUs, the request signal of which is not latched by the latch circuits 91 and 92. The service right (*) is forced to return to the CPU(2), as an initial state, each time the slice timer circuit times out. Also, the service right (*) is forced to return to the CPU(2) when a request signal for accessing the common-memory is latched by the latch circuit 91 or 92. However, even though the service right is returned to the initial state, the priority level of the rotational priority is maintained unchanged. The priority level of the rotational priority changes when a request for access to the common-memory, which request has a rotational priority, is served.

FIG. 22 is a timing chart of an operation performed in the present embodiment. In the present embodiment, the CPU(1) always has the highest priority level, the CPU(2) and the CPU(3) are higher priority requesting sources, and the CPUs (4) to (6) are lower priority requesting sources. The sampling performed on request signals for access to the common-memory is always performed when the request, of which request signal is not latched by the latch circuit 91 or 92, is being served. In FIG. 22, S11 to S13 represent a timing at which at least one request signal for access to the common-memory is latched. RS11 to RS13 represent a timing at which the slice timer circuit 96 times out and latch circuits 91 and 92 are reset so as to perform a sampling of request signals.

A description of an operation of the present embodiment is given, with reference to FIG. 22, form a state where the CPU(4) is served. After the CPU(4) is served, the state of the rotational priority is turned to the state (301) where the CPU(5) has the highest priority among the CPUs included in the rotational priority system.

At S11, the service to the CPU(4) is completed and a sampling is performed on request signals. At this time, since the request signal from the CPU(2) is in the active state, the CPU(2) is served next. During the service to the CPU(2), the slice timer circuit times out, and thus the request signal latched in the latch circuit 91 is reset after the service to the CPU(2) has been completed. Another sampling is then performed on request signals. At this time, since the request signals from the CPU(3) and the CPU(5) are in the active state, the CPU(3) is served first, and then the CPU(5) will be served. However, a request signal from the CPU(1) is latched by the latch circuit 99 during the service to the CPU(3), the CPU(1) is served before a service to the CPU(5) is performed. The CPU(5) is served after the service to the CPU(1) has been completed. The state of the priority order of the rotational priority remains unchanged until the service to the CPU(5) is completed. After the service to the CPU(5) has been completed, the state of the priority order is changed to the state (302).

When the service to the CPU(5) is completed at S12, another sampling is performed to latch request signals which are in the active state. At this time, although the request signals from the CPU(2) and the CPU(6) are in the active state, the CPU(1) is served first because the request signal from the CPU(1) is also in the active state. Since the slice timer circuit 96 times out during the service to the CPU(1), the latch circuits 91 and 92 are reset after the service to the CPU(1) has been completed, and then another sampling is performed. Because the request signals from the CPU(2) and the CPU(6) are still in the active state, these request signals are latched again at RS12. Because the CPU(2) has a priority level higher than that of the CPU(6), the CPU(2) is served first. During the service to the CPU(2), a request for accessing to the common-memory is made by the CPU(1). Accordingly, the CPU(1) is served after the service to the CPU(2) has been completed and before the service to the CPU(6) is performed.

After the service to the CPU(6) has been completed, a sampling is performed at S13. In this sampling, the request signals from the CPU(2) and the CPU(4) are latched. However, there is a request signal from the CPU(1), the CPU(1) is served first. Because the slice timer circuit 96 times out at RS13 immediately after the service to the CPU(1) has been completed, the request signals from the CPU(2) and the CPU(4) currently being latched are reset, and a sampling is performed to latch request signals. In this case, the request signals from the CPU(2) and the CPU(4) are latched again. Because the CPU(2) has a priority level higher than that of the CPU(4), the CPU(2) is served first. During the service to the CPU(2), a request for accessing to the common-memory is made by the CPU(1). Accordingly, the CPU(1) is served after the service to the CPU(2) has been completed and before the service to the CPU(6) is performed.

As mentioned above, in the present embodiment, the CPU(1) is given the highest priority level, and always be served immediately after the service currently performed has been completed. Accordingly, the CPU(1) can be access to the common-memory without awaiting more than one access cycle. Additionally, because the present embodiment has the structure similar to that of the above-mentioned fourth embodiment, the present embodiment has the same advantages with the fourth embodiment. That is, in the present embodiment, a service to each of the CPUs is performed according to the priority order including the fixed higher priority order system and the rotational priority system by latching the request signals by a single sampling performed on all request signals. Because the sampling is repeated at predetermined periods by means of slice timer circuit, a service to the CPUs to which a fixed priority order is assigned is always performed at the predetermined periods. Additionally, the CPUs to which the rotational priority is assigned are equally served.

The present invention is not limited to the specifically disclosed embodiments, and variations and modifications may be made without departing from the scope of the present invention.

What is claimed is:

1. A common-memory controlling method for controlling data transfer between a common-memory and a plurality of central processing units, in which each of the central processing units is given a respective priority level, the common-memory controlling method comprising:

a) separating a respective CPU bus connected to each of said central processing units from a common-memory bus connected to said common-memory;

b) generating a request signal for accessing said common-memory when a respective central processing unit requires access to said common-memory;

c) arbitrating the request signals of said central processing units so that a request signal corresponding to one of said central processing units is selected, wherein said one of said central processing units whose request signal is selected has a highest priority level;

d) generating control signals for controlling a bus connection corresponding to said one of said central processing units so that the CPU bus connected to said one of said central processing units is connected to said common-memory; and d) allowing the central processing units indirect access to said common-memory via a transfer control unit so as to allow even central processing units of slower processing speed not to affect access time to said common-memory.

2. The common-memory controlling method as claimed in claim 1, wherein each of said CPU bus and said common-memory bus comprises an address bus transferring address data and a data bus transferring data to be transferred to/from said common-memory, the common-memory controlling method further comprising the step of:

e) converting first address data used in a memory area of each of said central processing units into second address data used in said common-memory by adding predetermined data to said first address data so that consecutive addresses in said common-memory are assigned to each of the central processing units.

3. The common-memory controlling method as claimed in claim 1, further comprising the steps of:

f) generating a pre-load signal when a data reading operation is completed g) storing next data in said common-memory to a transparent data latch according to the pre-load signal, said transparent data latch being provided between the data bus of each of the CPU bus and the data bus of the common-memory bus;

h) generating pre-load address data according to the pre-load signal;

i) comparing the pre-load address data with address data supplied by one of the central processing units requesting a data reading operation so as to determine whether or not the pre-load address corresponds to the address data supplied by the one of the central processing units; and j) transferring the next data stored in the transparent data latch instead of reading the next data from the common-memory.

4. The common-memory controlling method as claimed in claim 3, wherein each of said CPU bus and said common-memory bus comprises an address bus transferring address data and a data bus transferring data to be transferred to/from said common-memory, the common-memory controlling method further comprising the step of:

k) converting first address data used in a memory area of each of said central processing units into second address data used in said common-memory by adding predetermined data to said first address data.

5. The common-memory controlling method as claimed in claim 1, wherein each of said central processing units is assigned to one of a fixed priority order system and a rotational priority order system, central processing units assigned to the fixed priority order system having a higher priority level than that assigned to said rotational priority order system, the common-memory controlling method further comprising the steps of:

l) sampling the request signals at a predetermined period so as to perform an arbitration of the step c);

m) rotating the priority order of the rotational priority order system when one of the central processing units assigned to the rotational priority order system is served to access to the common-memory; and n) clearing the request signals at each predetermined period so as to perform another sampling of the step l).

6. The common-memory controlling method as claimed in claim 5, wherein one of the central processing units is given a higher priority level than any of the other central processing units, the common-memory controlling method further comprising the step of:

o) serving to the central processing unit given a higher priority level than any other central processing units, when a request signal supplied by the central processing unit given a higher priority level than any other central processing units, immediately after a currently performed service to other central processing units has been completed.

7. A common-memory controlling apparatus for controlling data transfer between a common-memory and a plurality of central processing units, in which each of the central processing units is given a respective priority level, the common-memory controlling apparatus comprising:

separating means for separating a respective CPU bus connected to each of said central processing units from a common-memory bus connected to said common-memory;

request signal generating means for generating a request signal for accessing said common-memory when a respective central processing unit requires access to said common-memory;

arbitration means for arbitrating the request signals supplied by said central processing units so that a request signal corresponding to one of said central processing units is selected, wherein said one of said central processing units whose request signal is selected has a highest priority level;

control signal generating means for generating control signals for controlling a bus connection corresponding to said one of said central processing units so that the CPU bus connected to said one of said central processing units is connected to said common-memory; and a transfer controlling circuit for allowing the central processing units indirect access to said common-memory so as to allow even central processing units of slower processing speed not to affect access time to said common-memory.

8. The common-memory controlling apparatus as claimed in claim 7, wherein each of said CPU bus and said common-memory bus comprises an address bus transferring address data and a data bus transferring data to be transferred to/from said common-memory, and the common-memory controlling apparatus further comprises converting means for converting first address data used in a memory area of each of said central processing units into second address data used in said common-memory by adding predetermined data to said first address data so that consecutive addresses in said common-memory are assigned to each of the central processing units.

9. The common-memory controlling apparatus as claimed in claim 8, wherein said converting means comprises:

a plurality of register files which output said predetermined data;

a decoder supplying the first address data to the register files, one of the register files are selected according to a value of the first address data and said request signal being supplied to the register files; and an adder which adds the predetermined data supplied by the one of selected register files to the first address data so as to convert the first address data to the second address data.

10. The common-memory controlling apparatus as claimed in claim 7, further comprising:

pre-load signal generating means for generating a pre-load signal when a data reading operation is completed;

storing means for storing next data in said common-memory to a transparent data latch according to the pre-load signal, said transparent data latch being provided between the data bus of each of the CPU buss and the data bus of the common-memory bus;

pre-load address data generating means for generating pre-load address data according to the pre-load signal;

comparing means for comparing the pre-load address data with address data supplied by one of the central processing units requesting a data reading operation so as to determine whether or not the pre-load address corresponds to the address data supplied by the one of the central processing units; and transferring means for transferring the next data stored in the transparent data latch instead of reading the next data from the common-memory.

11. The common-memory controlling apparatus as claimed in claim 7, wherein each of said CPU bus and said common-memory bus comprises an address bus transferring address data and a data bus transferring data to be transferred to/from said common-memory, the common-memory controlling apparatus further comprising converting means for converting first address data used in a memory area of each of said central processing units into second address data used in said common-memory by adding predetermined data to said first address data.

12. The common-memory controlling apparatus as claimed in claim 11, wherein said converting means comprises:

a plurality of register files which output said predetermined data;

a decoder supplying the first address data to the register files, one of the register files is selected according to a value of the first address data and said request signal being supplied to the register files; and an adder which adds the predetermined data supplied by the one of selected register files to the first address data so as to convert the first address data to the second address data.

13. The common-memory controlling apparatus as claimed in claim 7, wherein each of said central processing units is assigned to one of a fixed priority order system and a rotational priority order system, central processing units assigned to the fixed priority order system having a higher priority level than that assigned to said rotational priority order system, the common-memory controlling apparatus further comprising:

sampling means for sampling the request signals at a predetermined period so as to perform an arbitration performed by said arbitration means;

rotating means for rotating the priority order of the rotational priority order system when one of the central processing units assigned to the rotational priority order system is served access to the common-memory; and clearing means for clearing the request signals at each predetermined period so as to perform another sampling performed by said sampling means.

14. The common-memory controlling apparatus as claimed in claim 13, wherein one of the central processing units is given a higher priority level than any other central processing units, the common-memory controlling apparatus further comprising means for serving to the central processing unit given a higher priority level than any other central processing units, when a request signal supplied by the central processing unit given a higher priority level than any other central processing units, immediately after a currently performed service to other central processing units has been completed.

* * * * *